(12) United States Patent
Groebner

(10) Patent No.: US 11,214,324 B2
(45) Date of Patent: Jan. 4, 2022

(54) MOTORCYCLE SEAT ASSEMBLY

(71) Applicant: KTM AG, Mattighofen (AT)

(72) Inventor: Helmut Groebner, Waging am See (DE)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 16/758,370

(22) PCT Filed: Oct. 2, 2018

(86) PCT No.: PCT/EP2018/076709
§ 371 (c)(1),
(2) Date: Apr. 22, 2020

(87) PCT Pub. No.: WO2019/086184
PCT Pub. Date: May 9, 2019

(65) Prior Publication Data
US 2020/0262502 A1  Aug. 20, 2020

(30) Foreign Application Priority Data

Oct. 11, 2017 (DE) .................... 10 2017 125 524.9

(51) Int. Cl.
*B62J 1/12* (2006.01)
*B62J 1/20* (2006.01)
*B62J 1/14* (2006.01)

(52) U.S. Cl.
CPC . *B62J 1/12* (2013.01); *B62J 1/20* (2013.01); *B62J 1/14* (2013.01)

(58) Field of Classification Search
CPC .................. B62J 1/14; B62J 1/20; B62J 1/12

USPC .......................................... 297/215.16, 217.6
See application file for complete search history.

(56) References Cited

U.S. PATENT DOCUMENTS

| 3,588,171 A | * | 6/1971 | Rich, Jr. | .................... B62J 1/26 |
|  |  |  |  | 297/215.16 |
| 4,026,600 A | * | 5/1977 | Kutaguchi | ................. B62J 1/18 |
|  |  |  |  | 297/214 |
| 5,971,477 A | * | 10/1999 | Bell | ........................... B62J 1/00 |
|  |  |  |  | 297/195.1 |
| 2006/0180373 A1 |  | 8/2006 | Hanagan |  |

(Continued)

FOREIGN PATENT DOCUMENTS

DE  202007009922 U1  10/2007
EP  1-598-169 B1  4/2012

(Continued)

OTHER PUBLICATIONS

Japanese Patent Office, "Notification of Reasons for Rejection," (Office Action), dated Jun. 15, 2021 (on counterpart Japanese Patent Application No. 2020-523733).

*Primary Examiner* — Milton Nelson, Jr.
(74) *Attorney, Agent, or Firm* — Rod D. Baker

(57) ABSTRACT

A motorcycle seat arrangement with a support structure, a seat cushion, arranged on the support structure, and a seat cushion cover spanning the seat cushion. The support structure has a first side facing the seat cushion and a second side facing away from the seat cushion. The second side of the support structure has an outer region with outer edge sections. Body sections of the seat cushion cover overlaps at least parts of the outer edge sections of the outer region; the seat cushion cover is a three-dimensional, elastic, molded body.

17 Claims, 22 Drawing Sheets

(56) References Cited

U.S. PATENT DOCUMENTS

| | | | |
|---|---|---|---|
| 2010/0207416 A1 | 8/2010 | Noue | |
| 2012/0242122 A1* | 9/2012 | Kawatani | B62J 1/18 |
| | | | 297/214 |
| 2015/0183476 A1* | 7/2015 | Chiba | B62J 1/12 |
| | | | 297/214 |
| 2015/0274068 A1* | 10/2015 | Falconi | B60N 2/60 |
| | | | 297/217.6 |

FOREIGN PATENT DOCUMENTS

| | | |
|---|---|---|
| JP | 0000S5515171 U | 1/1980 |
| JP | S56-091183 U | 7/1981 |
| JP | S58-185382 A | 10/1983 |
| JP | 2003-127930 A | 5/2003 |
| JP | 2005-125863 A | 5/2005 |

* cited by examiner

MOTORCYCLE SEAT ASSEMBLY

BACKGROUND OF THE INVENTION

Field of the Invention

The present invention relates to a motorcycle seat arrangement. More specifically, the seat arrangement has a support structure, a seat cushion arranged on the support structure, and a seat cushion cover spanning the seat cushion. The support structure has a first side facing the seat cushion and a second side facing away from the seat cushion and the second side has at least one section with an outer edge region and at least one section of the seat cushion cover overlaps at least part of the section of the outer edge region. The motorcycle seat arrangement may be a single seat or saddle for the rider of the motorcycle, or a motorcycle seat arrangement or bench seat for the rider and passenger, or a motorcycle seat arrangement or saddle or bench seat for the passenger only.

Background Art

A motorcycle seat assembly must perform different functions depending on the type or category of motorcycle on which it is used. For example, on a motorcycle used for long tours or long distance riding, the seating arrangement must provide good seating comfort for the users of the motorcycle and, on the other hand, a stable support to prevent, for example, unintentional lateral or longitudinal movement of the user.

In the case of a motorcycle intended for sporty, ambitious or racing riding, the seating arrangement must allow the rider who prefers a hang-off style to easily change his seating position on the seating arrangement, i.e., to change his seating position from the upper seating surface of the seating arrangement facing left or right or from the lateral seating position back towards the upper seating surface, depending on the direction of cornering.

Well-known motorcycle seat arrangements have a seat cushion cover which is made of a plastic material, for example polyvinyl chloride, and spans the seat cushion in the form of a thin cover. Depending on the wishes of the motorcycle user, the seat cushion cover can also be made of other materials, such as artificial leather or leather. All of the above materials have the disadvantage that the seat cushion cover tends to form wrinkles, i.e. folds are formed on the seat surface of the motorcycle seat assembly on which the user or users of the motorcycle sit with their buttocks or the insides of the users' thighs rest.

The formation of wrinkles of this kind considerably impairs seating comfort, because the wrinkles locally alter the counterpressure of the motorcycle seat arrangement felt by the user to a great extent, and this is perceived by the users as pressure points. In addition, the formation of wrinkles can reduce the freedom of movement of a sporty user of the motorcycle, since the user has to overcome the holding force exerted by the wrinkle when changing the position of the user relative to the seat surface; such a sporty user also finds disturbing the formation of wrinkles, in the form of pressure points, on the side surface of the motorcycle seat assembly.

In addition to the problems described above, well-known motorcycle seat covers also tend to increase wear and tear and, due to their uniform structure over the entire surface of the seat, can only provide constant coefficients of friction over the entire motorcycle seat arrangement or seat surface.

For motorcycles, design and manufacturing quality play a major role in purchasing decisions. Both areas are affected by the gap between the motorcycle seat assembly and the surrounding fairing components. It has been shown that known motorcycle seat assemblies tend to form a different gap dimension in the course of the gap between the seat assembly and fairing components, which is especially the case when the seat cushion cover of known motorcycle seat assemblies has lost its tension after a long period of operation and the gap dimension changes as a result.

On the basis of the Indian Patent Application No. IN2001MU01138 A, a motorcycle seat arrangement has become known which has a supporting structure on the upper side of which a seat cushion is arranged which is spanned by a seat cushion cover.

Based on U.S. Pat. No. 7,146,250 B1, a collapsible seat cover in the form of a weather or rain cover has become known. The cover can be attached to the motorcycle seat assembly and has a surrounding border with an elastic band, adhesive strip or pulling strip, by means of which the seat cover can be stretched over the seat cushion cover of the motorcycle seat assembly to ensure that the seat assembly remains dry in the event of rain or the application of water and solvents or cleaning agents.

On the basis of German patent publication DE 20 2007 009 922 U1, a motorcycle seat has become known which has a carrier structure on which an elastic seat cushion is arranged, and which is spanned by a seat cover. The seat cushion has a recess covered by the seat cover which ensures that a cavity is created under the seat cover and thus reduces the counter-pressure exerted by the seat cushion on the user's external genitals or pubic bone.

From the foregoing, the present invention for the elimination of the disadvantages described is based on the object of creating a motorcycle seat arrangement which eliminates the problem of wrinkling, has a high durability, allows exact and reproducible positioning to eliminate the problem of changing gap dimensions, and creates a high degree of design freedom.

Advantageous embodiments thereof are described in the further claims.

BRIEF SUMMARY OF THE INVENTION

Briefly summarized, the present invention provides a motorcycle seat arrangement with a support structure, a seat cushion arranged on the support structure, and a seat cushion cover spanning the seat cushion, in which the support structure has a first side facing the seat cushion and a second side facing away from the seat cushion. The second side has at least one section with an outer edge region, and at least one section of the seat cushion cover overlaps at least part of the section of the outer edge region whereby the seat cushion cover is an elastic three-dimensional molded body. The invention thus creates a motorcycle seat arrangement with a supporting structure and a seat cushion arranged thereon and a seat cushion cover which spans the seat cushion.

The support structure may have a first side, which may be an upper side, which for example may also be at an angle or in certain areas at an angle to the seat cushion, and also a second side, which for example may be the underside of the support structure, with which the support structure may be fixed directly or via intermediate elements, such as buffers or damper elements, to a frame component of the motorcycle. The second side can also be aligned, for example, with an inclined surface in the direction of the first side, so that both sides or surfaces can also be aligned with each other.

BRIEF DESCRIPTION OF THE SEVERAL VIEWS OF THE DRAWING

The invention is explained in more detail below on the basis of the drawing. In the drawing figures.

DETAILED DISCLOSURE OF THE INVENTION

Figure 1:
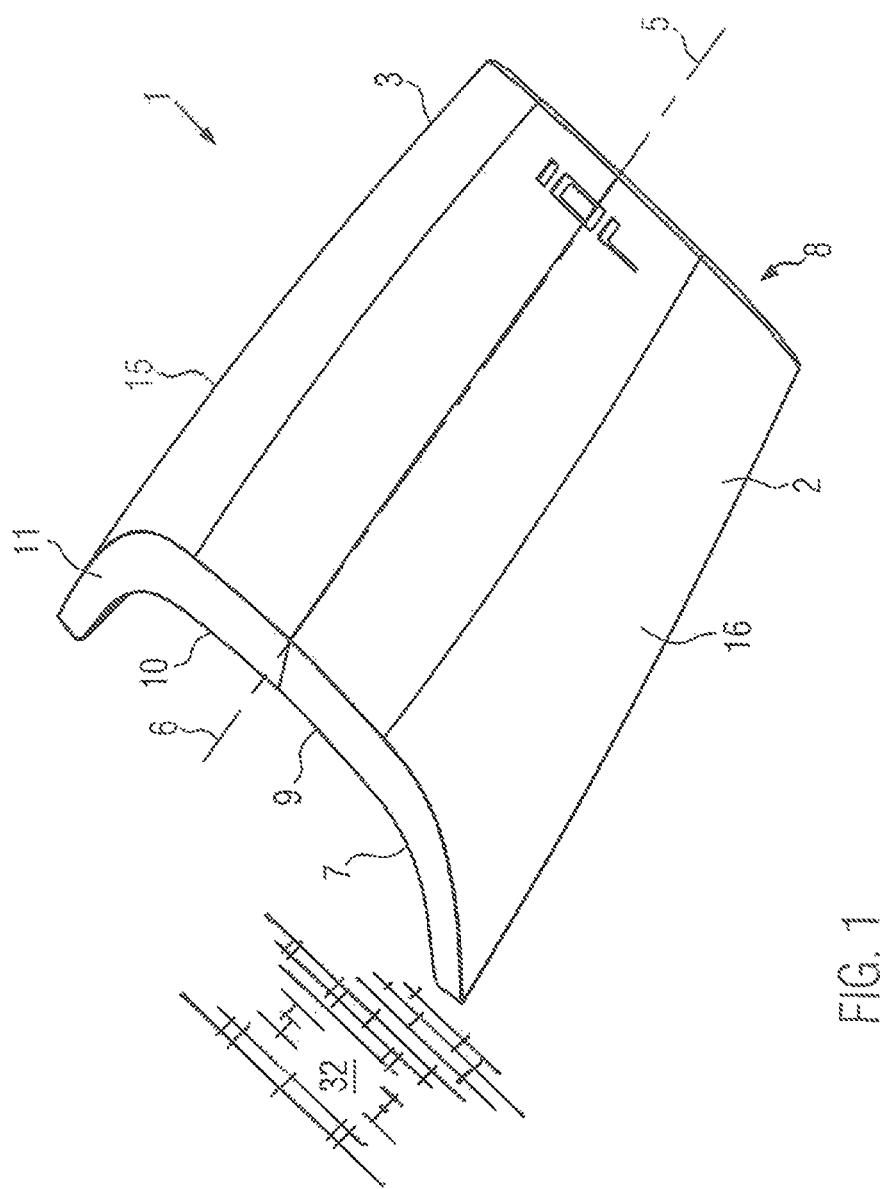
FIG. 1 is a perspective top view of a molded body design to form a motorcycle seat arrangement for a passenger or pillion rider.

There is provided by the present a motorcycle seat arrangement with a support structure, a seat cushion arranged on the support structure, and a seat cushion cover spanning the seat cushion. The support structure has a first side facing the seat cushion and a second side facing away from the seat cushion. The second side has at least one section with an outer edge region, and at least one section or portion of the seat cushion cover overlaps at least part of the section of the outer edge region, such that the seat cushion cover is an elastic three-dimensional molded body. The invention thus creates a motorcycle seat arrangement with a support structure and a seat cushion arranged thereon and a seat cushion cover which spans the seat cushion.

The support structure preferably has a first side, which may be an upper side, which for example may also be at an angle or in certain areas at an angle to the seat cushion. The support structure also preferably has a second side, which for example may be the underside of the support structure, with which the support structure may be fixed directly (or via intermediate elements, such as buffers or damper elements) to a frame component of the motorcycle. The second side can also be aligned, for example, with an inclined surface in the direction of the first side, so that both sides or surfaces can also be aligned with each other.

The support structure's second side preferably includes a section or portion having an outer edge which is overlapped by a section of the seat cushion cover, and to which the seat cushion cover may or may not be detachably attached. The seat cushion cover is not, as is the case with known motorcycle seat arrangements, a cover in the form of a flat material of a coated fabric, an artificial leather or leather or the like, which is stretched over the seat cushion; rather the present cushion cover is an elastic three-dimensional molded body, i.e., an actual body and not merely a material with a two-dimensional flat extension. The body may be made in one piece or integrally, and preferably has a three-dimensional structure of its own. The body has a wall thickness which makes the three-dimensional body appear as a body, and not just as a cover or covering formed by a flat structure—even when the body is separated from the seat cushion. A conventional seat cover formed from a known flat fabric, fabric, leather or leather substitute, or other seat covering material, assumes a shape corresponding to the seat cushion when it is placed on the seat cushion cover, i.e., stretched on or over it, but loses this shape when it is separated from the seat cushion. In contrast, the elastic three-dimensional molded body according to the present disclosure retains its three-dimensional body shape even when it is separated from the seat cushion. The molded body is therefore a three-dimensional body, whether it is attached to the seat cushion or separated from it.

The molded body has an outer shape or contour, which is designed as a seat surface for the user of the motorcycle, and an inner shape or contour, which is complementary in shape and surface to the shape or contour of the seat cushion. The molded body forms an accommodation space in which the seat cushion can be accommodated. The molded body thus has a three-dimensional structure and already possesses this three-dimensional structure before it is arranged on the seat cushion or the support structure.

A seat cushion cover, in the form of the molded body according to this disclosure, which is separate from the seat cushion and/or the support structure, also has a three-dimensionality or three-dimensional configuration with an elastic structural body. It accordingly differs from a flat structure in the form of a PVC, leather or artificial leather cover or the like, which only by virtue of its arrangement upon the seat cushion takes up a defined spatial form adapted to the seat cushion, but which does not have a defined spatial form separate from the seat cushion (even if it has been specifically adapted for the motorcycle seat arrangement, for example sewn in the form of an adapted seat cover).

The molded body has the advantage of exact and reproducible positioning with sharp and defined outer shapes and edges of the molded body, so that when it is arranged on a motorcycle with fairing components, a defined and sharp gap line between the motorcycle seat arrangement and the fairing components also occurs.

The molded body accommodates the seat cushion in its receiving space, and is therefore arranged on the seat cushion and the support structure as a body with its own defined shape and does not need to be stretched over the seat cushion like a loose cover material and tightened with tension. Consequently, the molded body of the present disclosure is capable of ensuring a reproducible alignment and arrangement of the motorcycle seat assembly relative to the motorcycle frame and any trim components. Therefore, the overall visual impression of the motorcycle seat assembly, relative to frame and trim components, does not change even after a long period of use.

A conventional seat cushion cover stretched as a known cover material on the seat cushion loses elasticity and tension over the service life and therefore changes its optical appearance. This affects also the overall optical impression of the motorcycle seat assembly over the service life, which also has the disadvantage that the above-mentioned gap dimensions between the motorcycle seat assembly and the peripheral components of the motorcycle change over the service life and the overall optical impression therefore deteriorates.

It is provided, according to an aspect of the invention, that the molded body has a lower side facing the seat cushion and an upper side serving as a seat surface, and has a receiving space accommodating the seat cushion. The receiving space is designed so that the molded body can be arranged on the seat cushion already arranged on the support structure; the seat cushion therefore contacts against the underside of the molded body. Thus it is also is provided, according to an alternative to this, that the seat cushion can be "foamed" into the receiving space, for example during the production of the molded body, that is, the cushion may be formed together with the molded body in the course of a plastics processing operation. The seat cushion and the molded body can be formed with materials of different degrees of Shore hardness.

It is also provided, according to an aspect of the invention, that the molded body is U-shaped in a sectional view transverse to a left center plane of the molded body. A section extending at least substantially in the direction of the longitudinal center plane preferably is provided, at at least one end region of a leg thereof, which extending section overlaps at least part of the section of the outer edge region of the second side of the support structure. This U-shaped design of the molded body can be selected in such a way that the two legs of the U-profile form the two lateral areas of the seat cushion cover (i.e. they serve as leg support for the user's inner legs), and the area between the two legs of the U-profile forms the seat surface of the seat cushion cover. The inner empty space between the two legs of the U-profile then forms the receiving space for the seat cushion.

This configuration also makes it clear that a seat cushion cover in the shape of the molded body provided according to the invention, when arranged in the form of an inverted U or inverted U-profile in the above-mentioned cross-section—i.e. with the opening of the U-profile between the two legs directed downwards—resting on a flat base, at least largely retains its three-dimensional configuration (and does not collapse like a known cover fabric of a known motorcycle seat arrangement and has an undefined spatial shape), which is characterized in that the molded body of the present disclosure always retains the same configuration in a repeated arrangement on the flat base in the manner described. In contrast, the cover materials of known seat assemblies do not reproducibly always assume the same configuration in a repeated arrangement on the flat base in the manner described, as they have too little stability or rigidity and wall thickness for this purpose; the present molded body has the stability and/or rigidity and/or wall thickness necessary for this purpose. This is due to the fact that, according to the invention, the molded body has a predetermined inherent strength or rigidity, in contrast to the known cover material of a known motorcycle seat arrangement.

It is also provided, according to another aspect of the invention, that the molded body has a longitudinal central axis, and has a front side and a rear side as viewed in the direction of the longitudinal central axis, and has on the front side and/or the rear side at least one portion or section extending in the direction of the seat cushion to be accommodated, which overlaps at least part of the section of the outer edge region of the second side of the support structure. The section at the front and/or rear of the molding can therefore overlap the outside or outer edge of the support structure, and can also do so together with the section or sections extending towards the longitudinal center plane of the molding, so that a configuration of the molding is possible which surrounds the support structure or the outer edge area of the support structure on all sides; and thus, the molded body is attached to the support structure by means of the internal stress of the elastic molded body, without the need for further holding means or aids for attaching the molded body to the support structure of the motorcycle seat assembly. This enables rapid production of the motorcycle seat arrangement in accordance with the invention, as well as exact and reproducible positioning of the molded body serving as a seat cushion cover on the structure of the motorcycle seat arrangement, because the molded body has only to be slipped or "snapped" over the support structure (or the outer edge area or areas on the support structure), and is then attached to the support structure without any further holding means.

Such a configuration also has the further advantage that the molded body can be detached from the support structure of the motorcycle seat assembly without the use of tools and can be replaced, for example, by a differently contoured and configured molded body. Accordingly, for example, a different seating behavior of different users of the motorcycle, i.e. driver and/or passenger, can be accommodated in a simple and quick manner, as the molded body can be easily and without the use of tools exchanged for a different molded body which takes account of the different seating behavior. This is achieved, for example, by selecting the appropriate degree of hardness of the plastic material used to form the molded body.

For a known motorcycle seat arrangement with a seat cushion cover made of a flat PVC material or similar, the fasteners holding the PVC material to the support structure would have to be loosened, for example by means of retaining clips, and then a seat cushion cover made of another flat material would have to be laboriously fixed again with retaining clips. Even after such a procedure, however, the known motorcycle seat arrangement would not offer a different seating behavior, because the replacement of a known flat material with another flat material does not change the elasticity values of the seat cushion under the flat material; thus the seating behavior perceived by the user does not change. However, in the motorcycle seat arrangement according to the present disclosure, a molded body with an elastic material with a different shore hardness grade can be fixed to the support structure, whereby the seating comfort provided by the motorcycle seat arrangement according to the invention can be adjusted or adapted to the seating behavior perceived by the user as pleasant or comfortable.

It is also intended, according to another aspect of the invention, that the molded body overlaps the outer edge area of the support structure, and may be attached to the support structure by means of an internal stress formed between the molded body and the edge area. In this way, the already mentioned tool-less assembly of the molded body to the support structure can be realized.

It is also provided, according to another aspect of the invention, that the molded body, on the support structure to be arranged, has sections facing edge areas of the molded body, which are formed in one piece or integrally with the molded body and extend inwardly as seen from the edge areas of the molded body. These one-piece or integral sections provided on the molded body form, as it were, overlapping regions or overlap regions which overlap or overspread or cover the outer edge regions of the support structure, and ensure that the molded body can be arranged on the support structure and is fixed without the need for a tool. The molded body is put over or overlapped or covered over the outer edge areas of the support structure by means of the overlapping areas or overlap areas and thus fastened to the support structure.

It is also provided by another aspect of the invention that associated areas of the sections of the molded body are integrally connected to each other, or associated areas of the sections are formed without integral physical connection. The provision of both possibilities takes account of the fact that, in the case of a design in which associated or adjacent areas of the sections of the molded body are integrally joined, the strength or holding force achieved by this design (when the molded body is arranged with the sections at the outer edge areas of the support structure) allows the molded body to be securely attached to the support structure without the need for any further holding means or aids. The second variant, without a one-piece physical connection between adjacent or associated sections of the molded body, means that this design mold can be easily removed from a mold, for example an injection mold.

It is also provided, according to another aspect of the invention, that a section of the molded body which overlaps the outer edge region of the support structure has, at least along a region of its longitudinal extension, at least one recess which has a depth which corresponds to a partial amount of the wall thickness of the section. An advantage of this configuration is that, if the sections of the body are optionally fixed at the outer edge of the support structure with aids or holding means in the form of clamps, for example, the deformation thus formed on the sections is not transferred to the lateral edge areas of the body (which serve as a support surface for the inner legs of the users of the motorcycle). The recess or longitudinal groove therefore acts as a means for compensating for stresses introduced into the section by the retaining means or aids.

It is also intended, according to another aspect of the invention, that the molded body should have a lower wall thickness in the area of the upper side serving as the seat surface than in lateral areas assigned to the edge area of the support structure. This configuration results in the elastically yielding seat surface providing a high degree of seating comfort, while the side surfaces adjoining the seat surface yet ensure a high degree of dimensional stability of the molded body—and also ensure that the line of the gap between the molded body and motorcycle fairing components does not change even during prolonged use.

It is also provided, according to another aspect of the invention, that the molded body is formed by means of at least one injection-moldable material, in particular a thermoplastic urethane material. The molded body preferably has a uniformly identical degree of Shore hardness, or at least has a region with a degree of Shore hardness deviating from this degree of Shore hardness. It is therefore also provided that the molded body is preferably formed from only one material with a predetermined degree of Shore hardness, but it is also provided that the molded body is also formed in sections or areas from two materials with different degrees of Shore hardness. This configuration has the advantage that different areas or sections of the body have different counter-pressure behavior; thus, the seating comfort of the body can even be adjusted in areas or sections. For example, it is possible to design an upper seat surface with a roughness value that differs from a roughness value on the side surfaces of the molded body and, for example, the roughness value on the side surfaces is considerably higher, thus achieving a holding force on the side surfaces that is advantageous for a sports-oriented driver or user.

It is also provided, according to another aspect of the invention, that the molded body is formed by means of at least one injection-moldable material, in particular a thermoplastic urethane material, and the molded body has a uniformly uniform degree of color or at least has a region with a degree of color deviating from this degree of color. In this way, the visual appearance of the molded body (and thus of the motorcycle seat assembly) can also be adapted in a variety of ways, e.g., different areas or sections of the molded body can be given different color schemes—which is not the case when using a known upholstery fabric of a known motorcycle seat assembly.

It is also provided, according to another aspect of the invention, that a section of the molded body which overlaps the outer edge region of the support structure is preferably detachably connected to the edge region of the support structure, at least along a region of its longitudinal extension, by means of non-positive or positive-locking or substance-locking means or a combination thereof. These additional locking means, which may be, for example, retaining clips, screws, rivets, adhesives, thermal fused joints, lock washers, snap elements, pin joints, tongue-and-groove joints and the like, are optional retaining means or aids or securing means which assist in securing the molded part at the outer edges of the support structure. Such additional means may be advantageous in the case of motorcycles used in off-road sports competitions, since such motorcycles are subject to strong impacts or vibrations and, in addition, need to be repositioned after a fall of the motorcycle. It has been shown that, after a fall, such an off-road sport motorcycle is frequently grasped by the motorcycle seat assembly in the rush of battle and lifted by a pulling force on it; the additional locking means then ensuring that a user of the motorcycle does not inadvertently pull the molding off the motorcycle seat assembly. These locking means are optional, and do not need to be fitted, for example, on a touring motorcycle, which is not normally raised by means of a handling or pulling upon the motorcycle seat assembly.

It is also provided, according to another aspect of the invention, that a holding section of the molded body overlapping the outer edge region of the support structure has holding means formed integrally with the section, which are designed for arrangement in recesses of the edge region of the support structure. These holding means may be, for example, pin-shaped or mushroom-shaped holders which are formed in one piece on the corresponding section or sections of the molded body which overlap the outer edge areas of the support structure. Thus, the holding means are, for example, like a pin connection which can be clipped into recesses in the support structure at the outer edge areas, and thus be releasably fixed in the recesses.

It is also provided, according to another aspect of the invention, that holding means are arranged or formed on the outer edge region of the support structure, which can be brought into engagement with recesses of the section of the molded body overlapping the outer edge region of the supporting structure. These holding means can, for example, be pin bodies with one or more than one fastening hook which engages in a recess or recesses of the section of the molded body overlapping the outer edge region of the support structure.

It is also provided, according to another aspect of the invention, that a section of the molded body which overlaps the outer edge region of the support structure is provided with a cross-sectional enlargement which is provided in one piece with the section, and which can be acted upon against the edge region by a holding means which can be releasably engaged with the support structure. The widening of the cross-section can, for example, be a bead which is arranged or molded on the inside of the overlapping section of the molded body, which is overlapped by a retaining section and is pressed or pressed against the outer edge region of the support structure; the retaining section thus being able to be releasably attached to the support structure, for example by means of a screw connection.

Finally, according to an aspect of the invention, a recess is formed on a rear portion of the motorcycle seat assembly, which is designed to receive an illumination device, and that the elastic three-dimensional molded body is designed to cover the recess and is translucently formed in the vicinity of the seat assembly's recess (a translucent portion nearby or adjacent the recess). This configuration makes it possible, for example, for a motorcycle tail light to be inserted into the recess of the motorcycle seat assembly, and for the recess together with the tail light to be covered by the molded body—which is designed to be translucent in the area of the recess or the tail light—so that in this way the tail light is fully integrated into the motorcycle seat assembly.

Attention is invited to the drawing figures. FIG. 1 of the drawing shows a perspective top view of a molded body to form a motorcycle seat arrangement for a passenger or pillion passenger of a motorcycle 61 according to FIG. 22. The molded body 1 has a three-dimensional design and has an upper side 3 serving as a seat surface 2. In the design shown, it is made of a thermoplastic polyurethane with a Shore A Shore hardness grade of 75 to 80 according to DIN 53505. The molded body 1 is elastically designed so that it can deform elastically when a user supports his or her buttocks on the seat surface 2 and, together with the seat cushion 4 shown in FIG. 7, for example, offers the user support, support and seating comfort.

Figure 2:
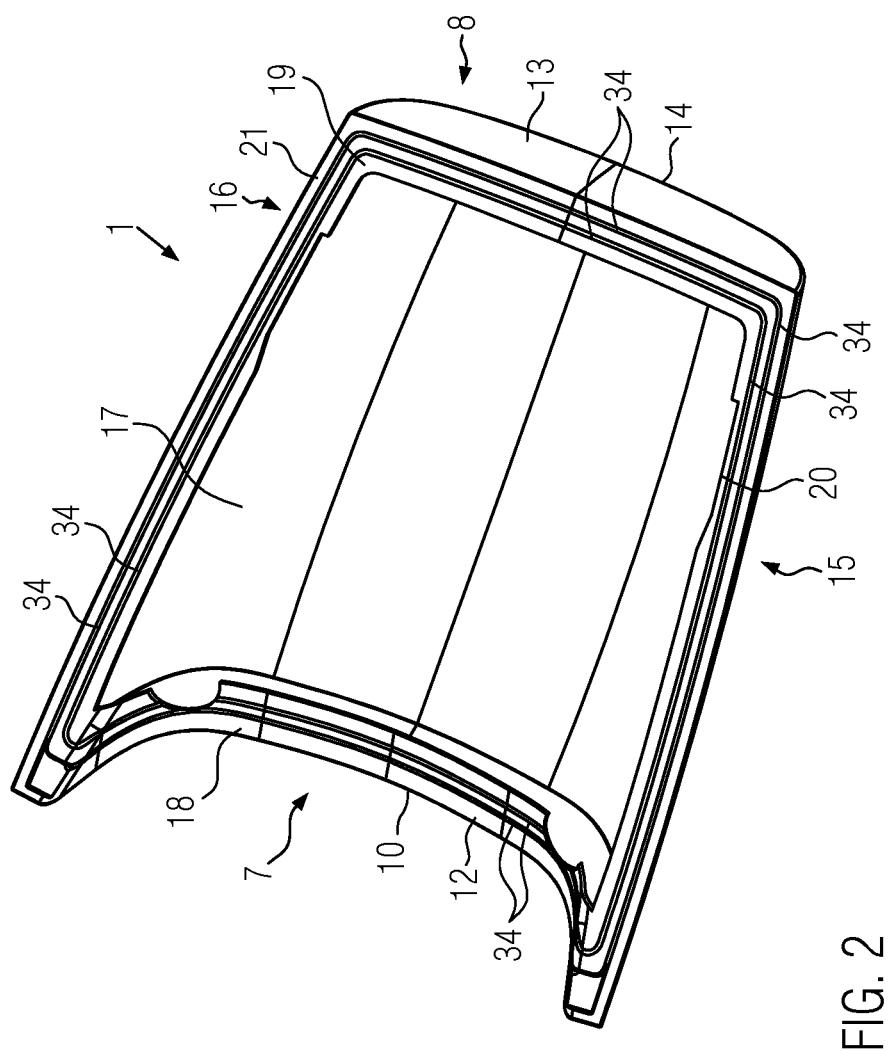
FIG. 2 is a perspective view, from below, of the design of the molded body according to FIG. 1.

As can be seen from FIG. 1 of the drawing, the molded body 1, viewed in the direction of a longitudinal central axis 5, which runs in the longitudinal central plane 6, has a front side 7 and a rear side 8; in the version shown, the front side 7 runs at an oblique angle to the upper side 3 and forms or has a cutting line 10 at the front edge 9, which forms the upper surface 11 on the front side 7 together with the lower surface 12 of the front side 7 according to FIG. 2.

Molding body 1 has an inclined surface 13 on the rear side 8, which can be seen more closely in FIG. 2 of the drawing, which forms or has a cutting line 14, which in turn forms the inclined surface 13 together with the seat surface 2. The side surfaces 15 and 16 of the molded body 1 serve as support surfaces for the inner thighs of the user sitting on the seat surface 2.

Figure 7:
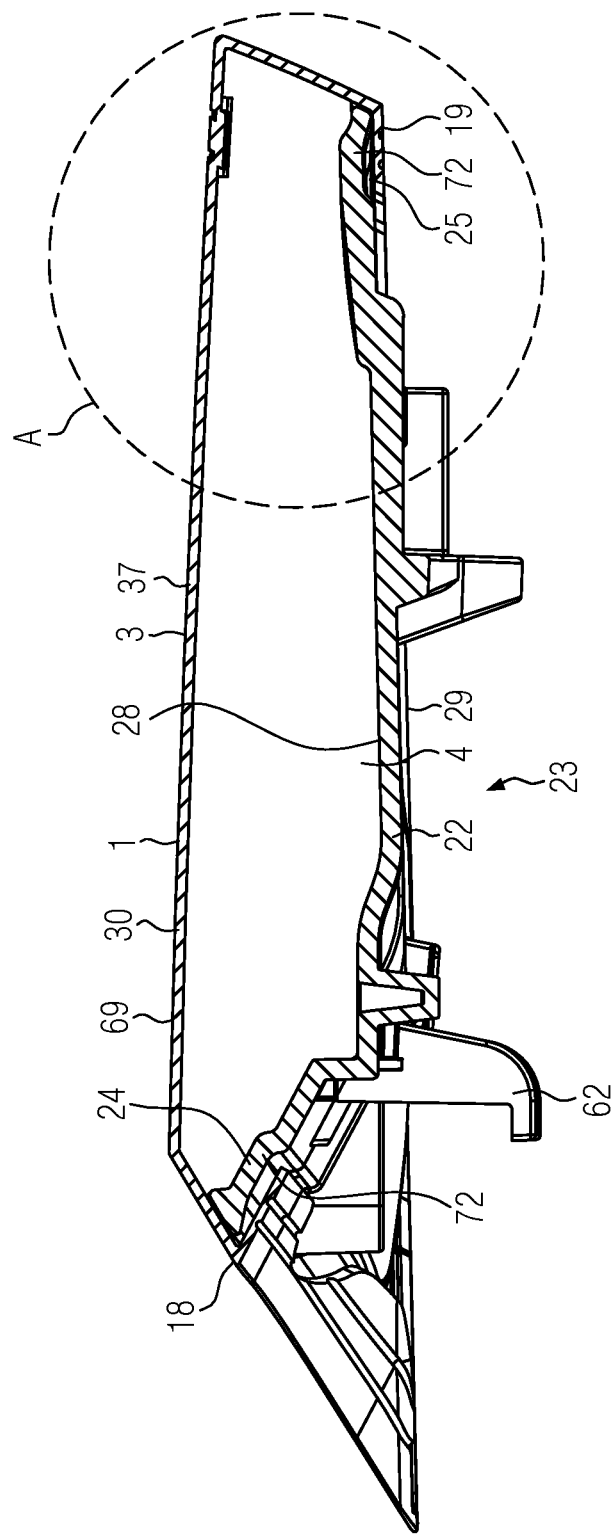
FIG. 7 is a sectional view, from the left, of the motorcycle seat arrangement depicted in FIG. 3.

FIG. 2 shows that the molded body 1 forms or defines an accommodation space 17, which serves to accommodate the seat cushion 4, for example, shown in section in FIG. 7. In addition, molded body 1 has body sections 18, 19, 20 and 21, which are each formed in one piece or integral with molded body 1 on both the front side 7 and the rear side 8 and in the area of the two side surfaces 15, 16; these body sections are also elastic and overlap the outer edge region 72, or the outer edge areas 72, of the support structure 22 of the motorcycle seat arrangement 23, thus ensuring that molded body 1 is fixed to the support structure 22.

The first end body section 18 formed at the front 7 of the molded body 1 overlaps the front edge section 24 of the support structure 22, as shown in FIG. 7 of the drawing, while the second end body section 19 formed at the rear 8 of the molded body 1 overlaps the rear edge section 25 of the support structure 22. The body section 20 formed on the right-hand side face 15 of molded body 1 overlaps the edge section 26, while the body section 21 formed on the left-hand side face 16 of molded body 1 overlaps the edge section 27 of the support structure 22, as shown in FIG. 9.

Figure 3:
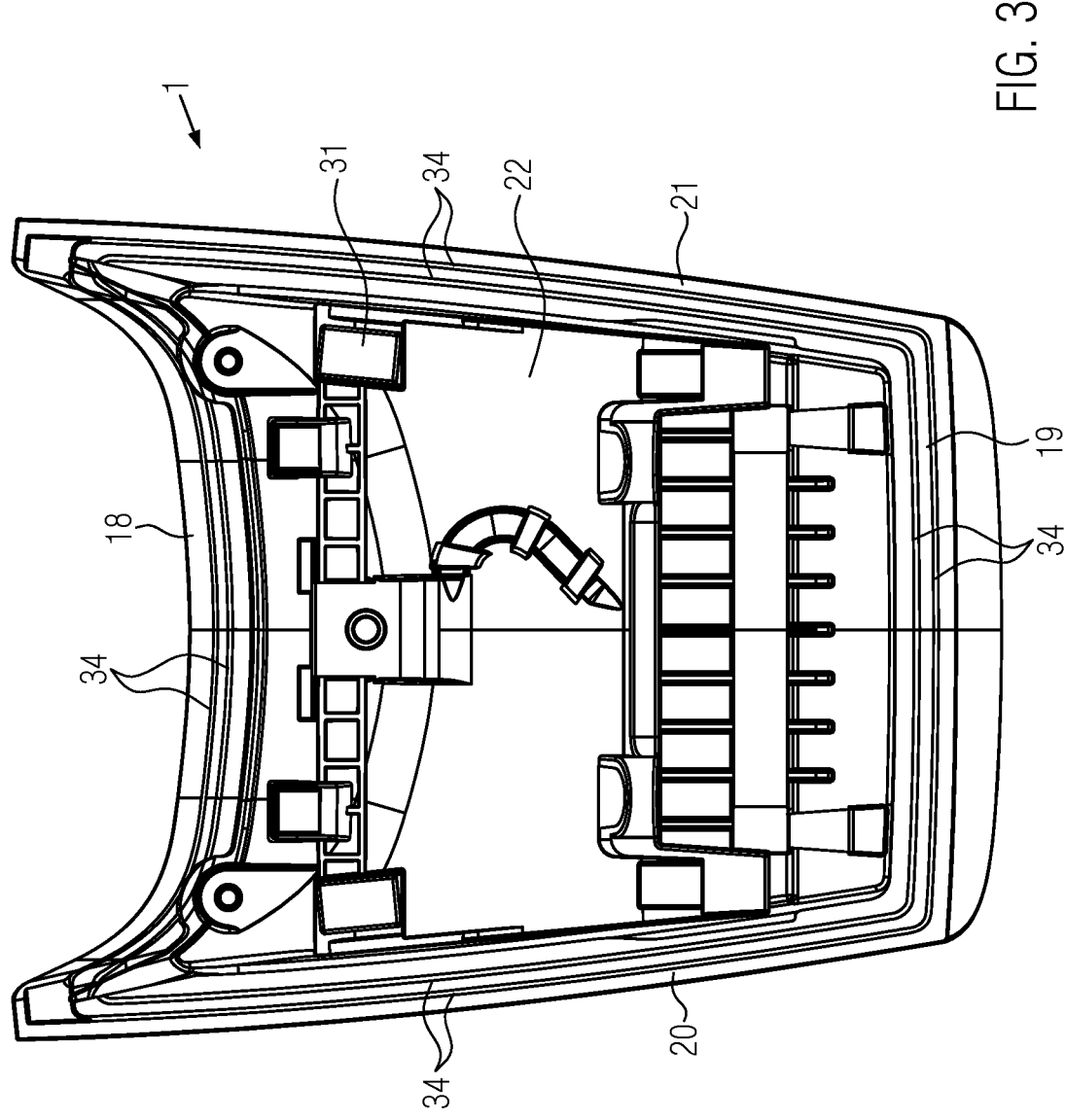
FIG. 3 is a view from below of a motorcycle seat assembly with the molded body arranged on a support structure as shown in FIG. 2.
Figure 9:
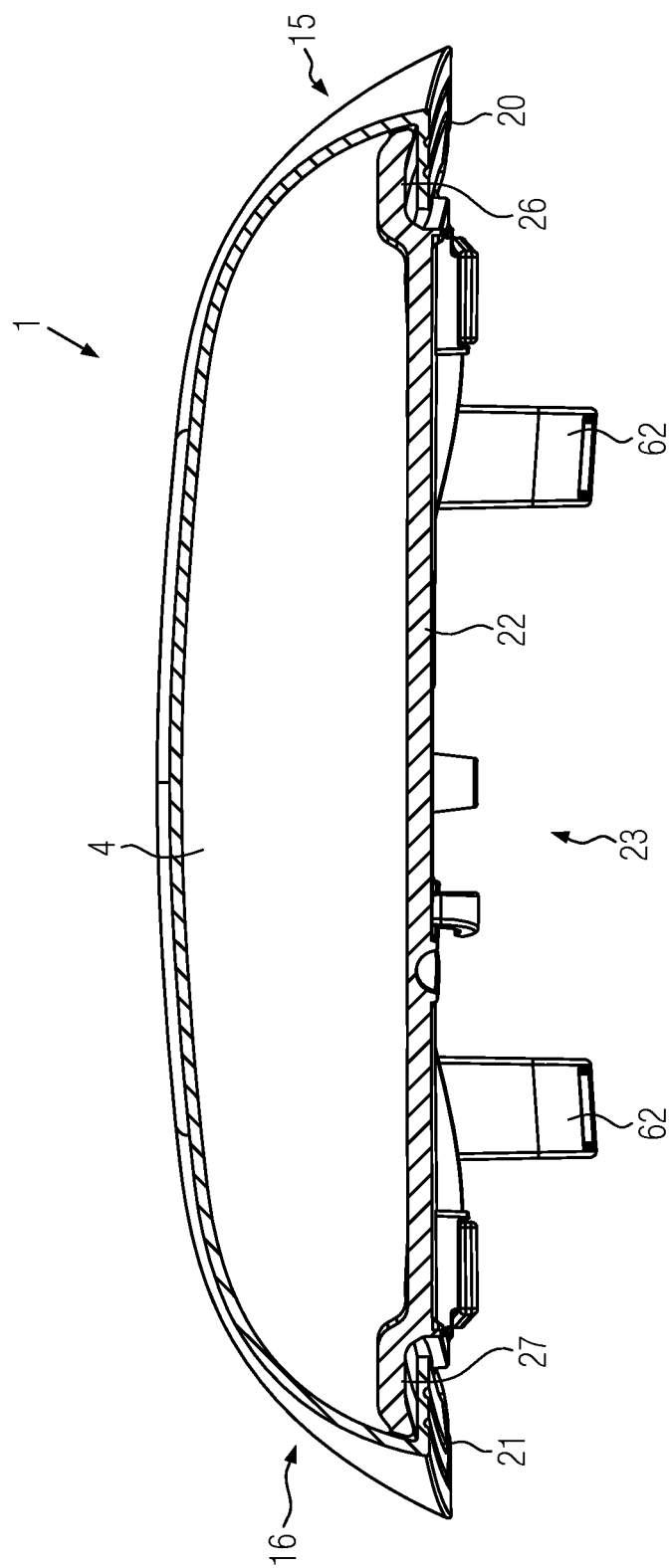
FIG. 9 is a rear cross-sectional view of the motorcycle seat arrangement seen in FIG. 3.

FIG. 9 of the drawing also shows that the molded body 1 is U-shaped in a cross-sectional view, and that the respective sections 20, 21 of the molded body 1 extend in the direction from the side faces 15, 16 towards the seat cushion 4. FIG. 3, showing the molded body 1 arranged on the support structure 22, shows that the body sections 18 and 19 of the molded body 1 also extend inwardly towards the seat cushion 4; thus, the body sections 18, 19, 20 and 21 of the molded body 1 represent overlapping sections or overlap sections each extending inwardly, and over the respective outer edge regions or edge sections 24, 25, 26, 27 of the supporting structure 22, whereby the residual stress of the molded body 1 or its sections 18, 19, 20 and 21 and the edge region or edge sections 24, 25, 26, 27 of the support structure 22 alone hold the molded body 1 firmly but detachably to the support structure 22.

As can be seen from FIG. 7, the support structure 22 has a first or top side 28 facing the seat cushion 4, and a second or bottom side 29 facing away from the seat cushion 4. Molded body 1 has an underside 30 facing the seat cushion 4 and the upper side 3 already mentioned and serving as seat surface 2. The support structure 22 can be placed or supported on a frame component 60 of the motorcycle 61 by means of the supports 31 shown for example in FIG. 3 of the drawing.

FIG. 1 of the drawing shows the molded body 1 placed on or resting on a support 32, which may be a tabletop or the like, and which rests on the support 32 via the sections 19, 20 and 21 shown in FIG. 2. In contrast to a seat cover made of an upholstery fabric, leather or imitation leather or another flat structure, molded body 1 has such inherent rigidity that molded body 1 retains its three-dimensional shape when it is arranged separately from the seat cushion 4, such as when resting on support 32. If, on the other hand, a known seat upholstery separated from a seat cushion for a motorcycle seat arrangement, which is made of an upholstery fabric, leather or imitation leather or another flat structure, is placed on such a base or support 32 for comparison purposes, then it collapses; that is, it loses its defined three-dimensional configuration or spatial shape, which it still has when placed on the seat cushion, since it has no inherent rigidity comparable to that of the molded body according to the invention.

Figure 4:
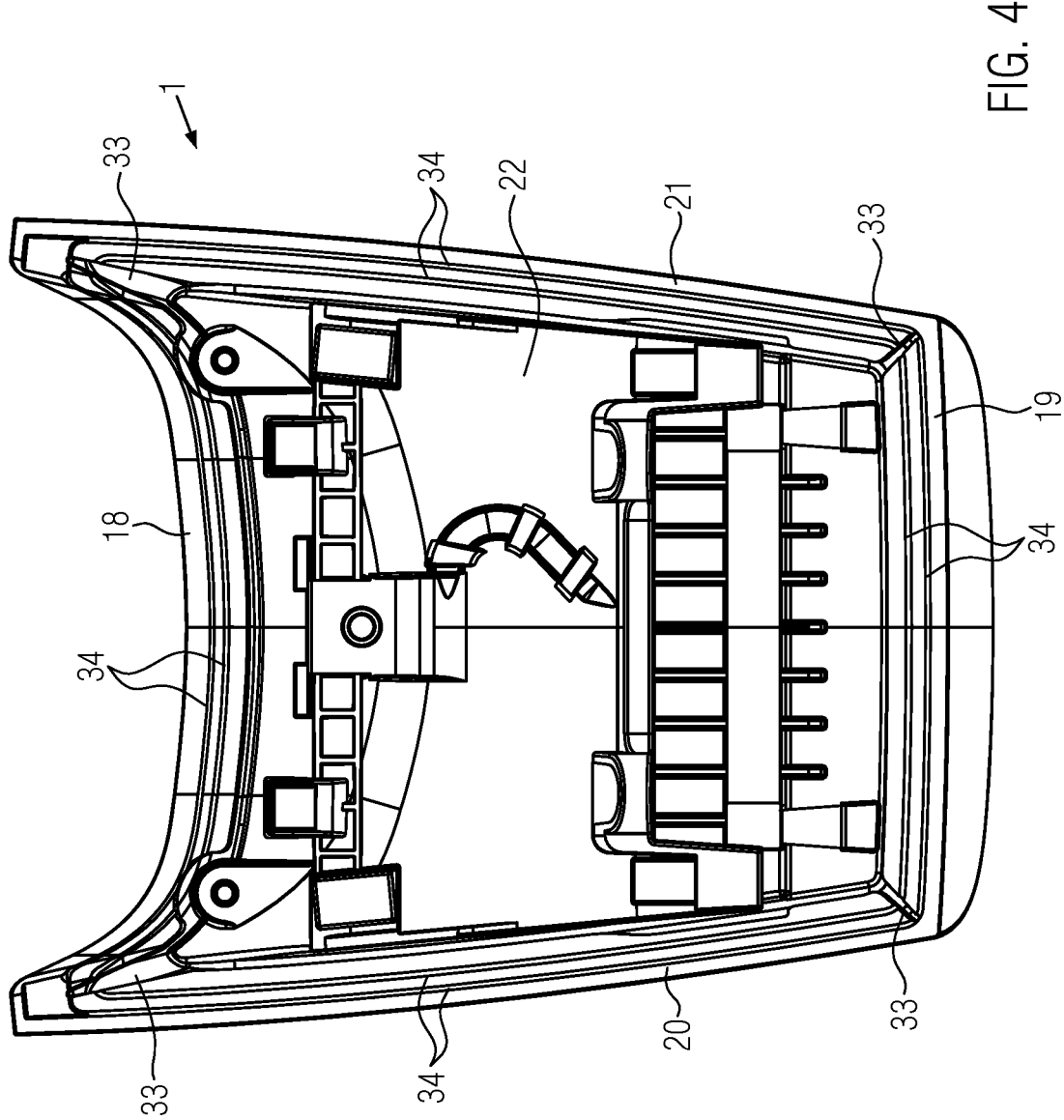
FIG. 4 is a view similar to that shown in FIG. 3, showing an alternative version of a molded body.

FIG. 2 shows an embodiment of molded body 1 in which the adjacent or associated sections 18 and 21 and 18 and 20 are each connected to each other in one piece. Similarly, the adjacent or associated sections 19 and 21 as well as 19 and 20 are connected to each other in one piece. In comparison, the design of molded body 1 shown in FIG. 4 shows that a clearance or slot 33 is formed between each of the sections 18 and 21 and 18 and 20, and that a clearance or slot 33 is also formed between each of the sections 19 and 21 and 19 and 20. The free space or slot 33 ensures that the molded body 1 can be more easily removed or shaped from a mold to produce molded body 1.

Figure 8:
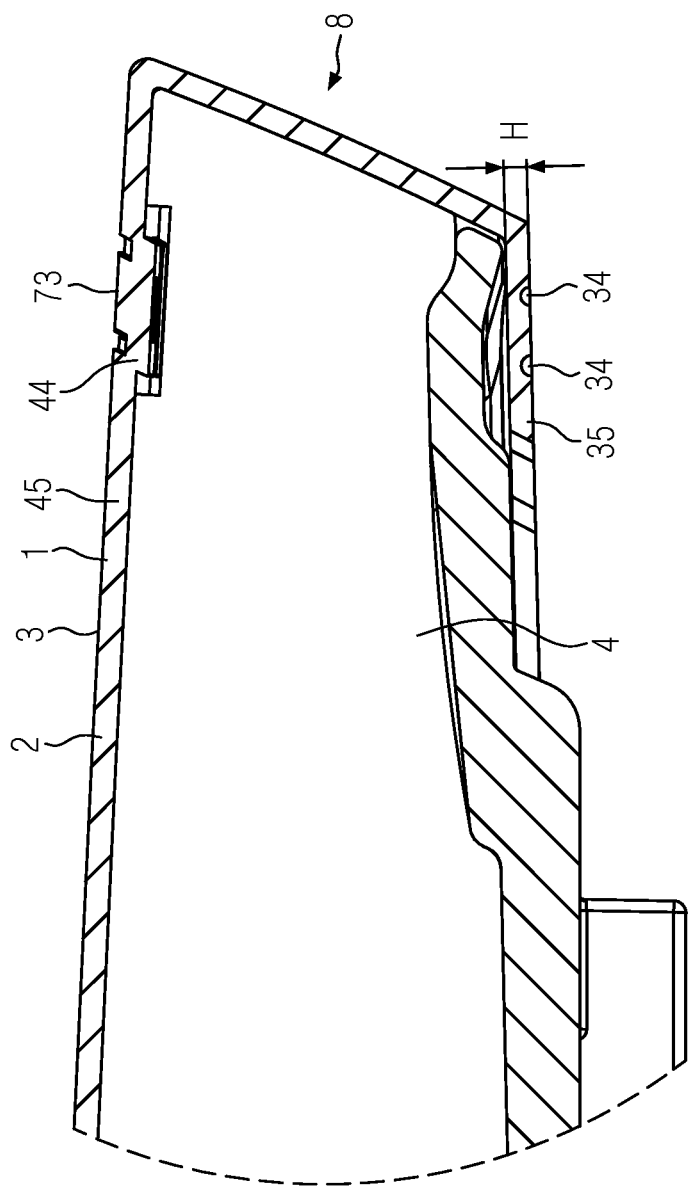
FIG. 8 is an enlarged detailed view of the portion of the seat arrangement delimited as "A" in FIG. 7.

On its underside in the area of sections 18, 19, 20 and 21, molded body 1 has two longitudinal recesses 34 in each case, which run parallel to each other in the respective section, as shown in FIG. 2. On the basis of FIG. 8 of the drawing, for example, it can be seen that the longitudinally running recesses 34 are semi-circular in cross-sectional view and have a depth corresponding to a partial amount of the wall thickness H of the profile 35 which forms the sections 18, 19, 20 and 21 of the molded body 1. The longitudinal recesses 34 serve to accommodate a deformation of the profile 35, which occurs when sections 18, 19, 20 and 21 are fixed or attached to the outer edge sections 24, 25, 26 and 27 via additional retaining means.

Figure 12:
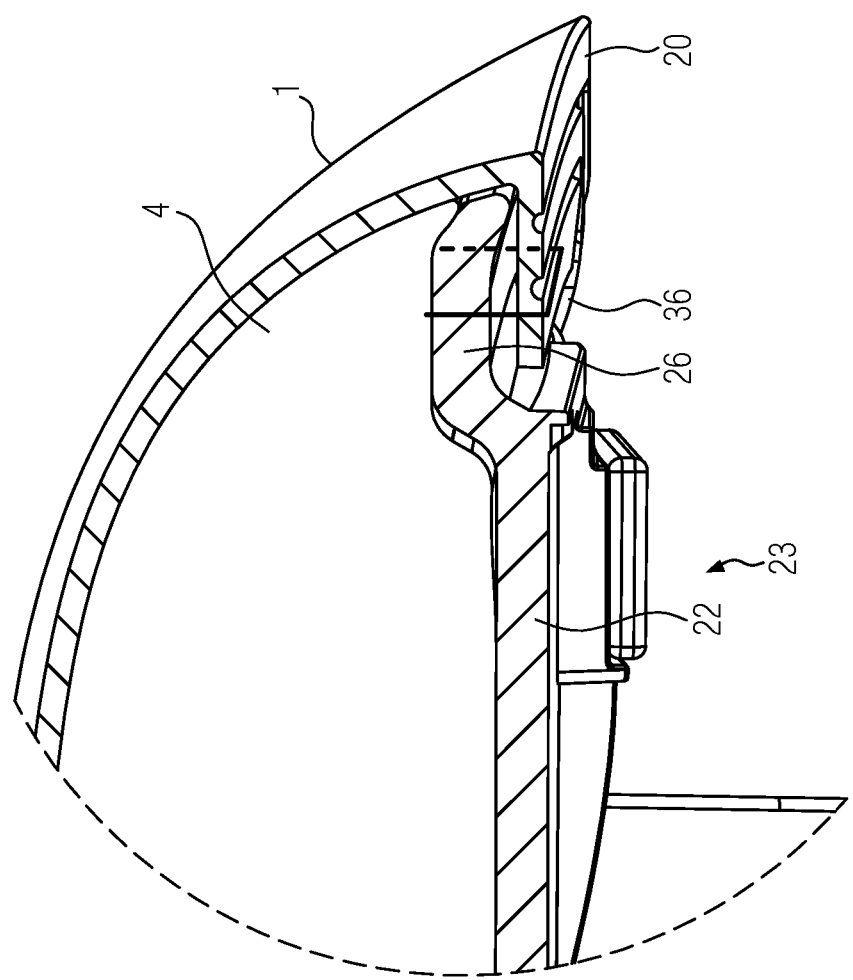
FIG. 12 is a partial sectional view of a motorcycle seat assembly with a molded body secured by means of retaining clips.

FIG. 12 shows such a case, in which, as an example, section 20 of molded body 1 is attached to the edge section 26 via retaining means in the form of retaining clips 36. In a similar way, the other sections 19, 20 and 21 can also be fixed to the edge sections 24, 25 and 27. The purpose of this additional fixing of the molding 1 or molded body 1 to the support structure 22 of the motorcycle seat assembly 23 is to prevent the molded body 1 from being inadvertently removed by the user from the seat cushion 4 and thus from the motorcycle seat assembly 23. As has been described above, this can occur, for example, for a motorcycle used in off-road sports competitions and where it is therefore quite possible that the fallen motorcycle is lifted up again by the user or rider of the motorcycle, and that the user or rider also grabs the motorcycle at the motorcycle seat arrangement 23 and straightens it up again.

Figure 10:
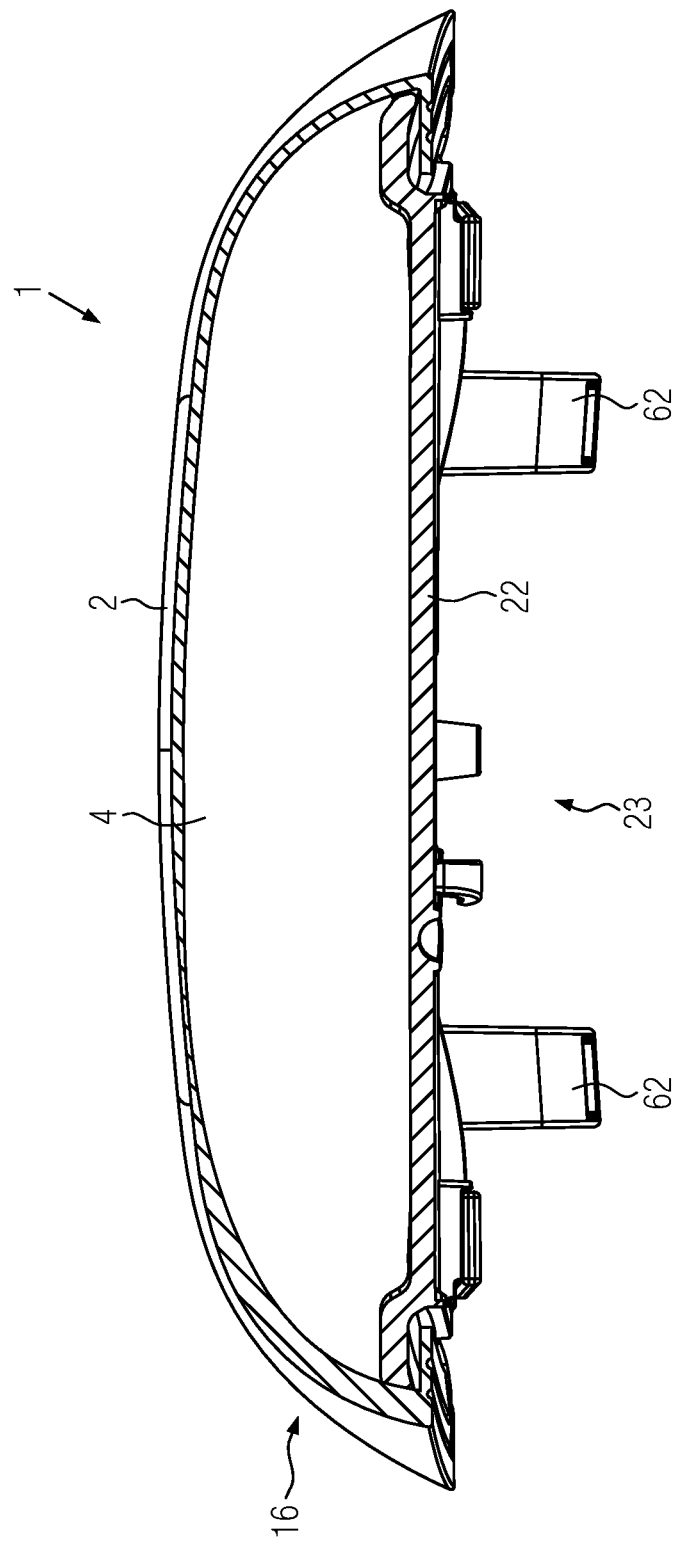
FIG. 10 is another cross-sectional view of a motorcycle seat assembly according to the present invention, with a modified version of a molded body.

FIG. 7 shows a molded body 1, the outer contour 37 of which has the same wall thickness everywhere, while in comparison, the design of molded body 1 in the area of the seat surface 2, as shown in FIG. 10, has a wall thickness which is significantly less than the wall thickness in the area of the side surface 16; this is used, for example, for the purposes of wear protection or the higher strength of the side surface areas 15, 16. Also at the side face 15 or at other areas or sections of the molded body 1, the wall thickness can therefore be greater or also smaller than at other areas or sections of the molded body 1.

Figure 11:
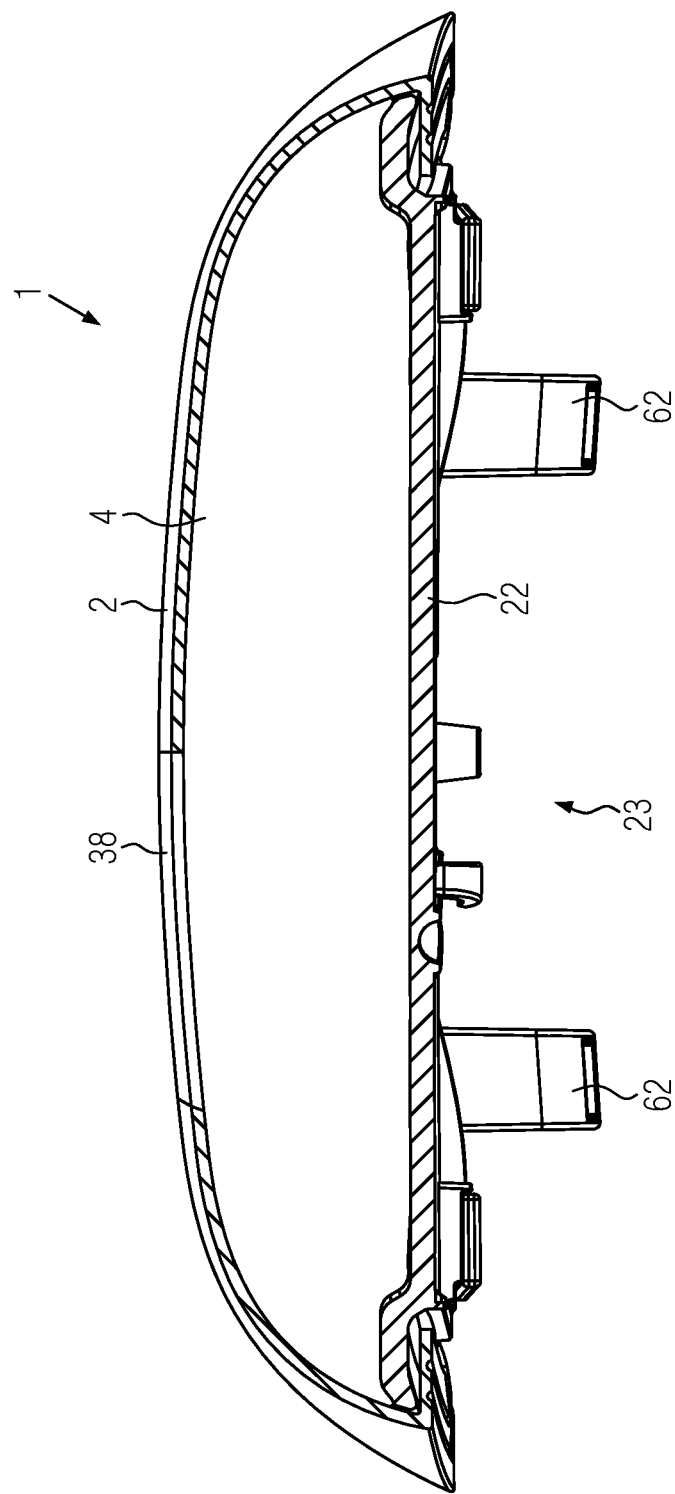
FIG. 11 is a cross-sectional view of a motorcycle seat assembly according to the present invention, illustrating another alternative version of a molded body.

FIG. 11 again shows a modified version of the molded body 1, which for the sake of explanation has a section 38 in the area of the seat surface 2, which is distinct from the area of the seat surface 2 surrounding the section 38 in terms of its design or structure. The term "distinction" is used here to express that the section 38 may have a different degree of Shore hardness than the areas of the seat surface 2 surrounding the section 38, and/or also that the section 38 may have a different degree of color than the areas surrounding the section 38. In this way, it is possible that the molded body 1 can have several degrees of color at different sections or areas, and it is also possible that the molding 1 or molded body 1 can have different degrees of hardness, textures or surface roughness at different sections or areas.

Figure 5:
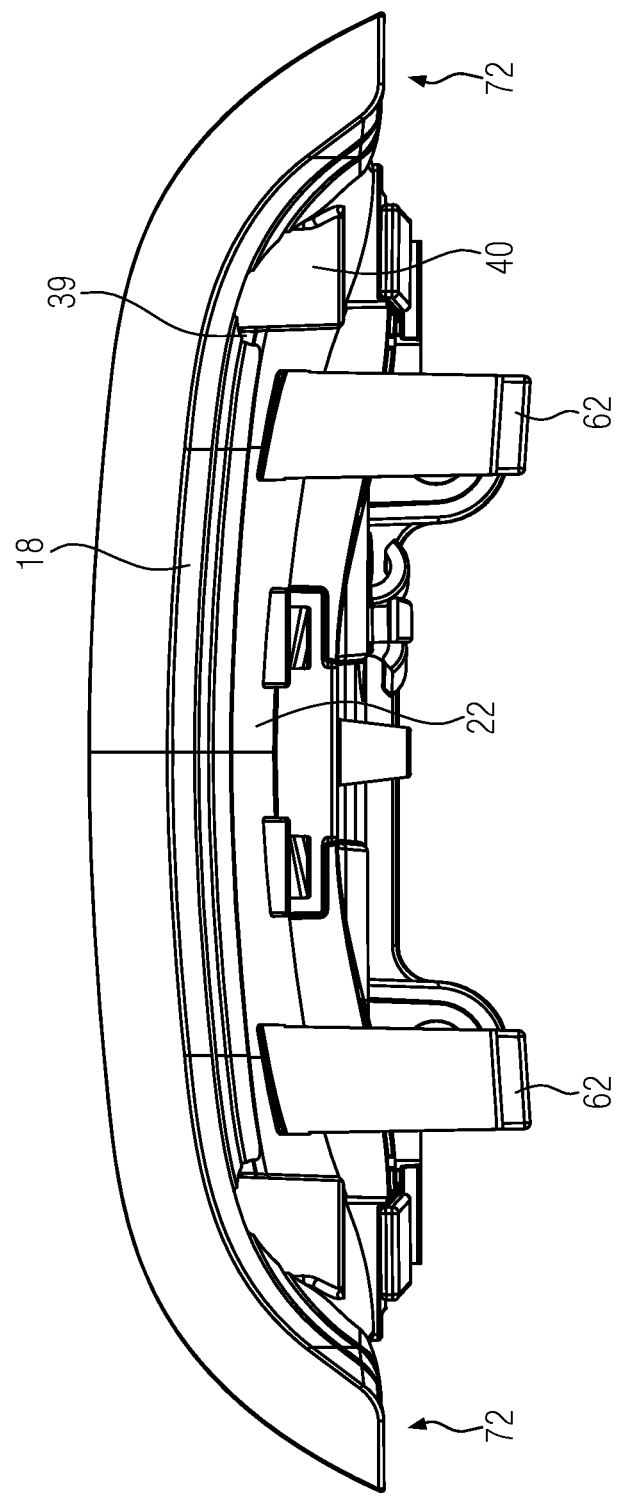
FIG. 5 is a front view of the motorcycle seat arrangement shown in FIG. 3.

FIG. 5 of the drawing shows, using section 18 as an example, that the sections can also have recesses or recesses 39, which are required, for example, for the attachment of mounting surfaces 40, by means of which the support structure 22. Thus the motorcycle seat arrangement 23 can be fixed to a frame component of a motorcycle.

Figure 6:
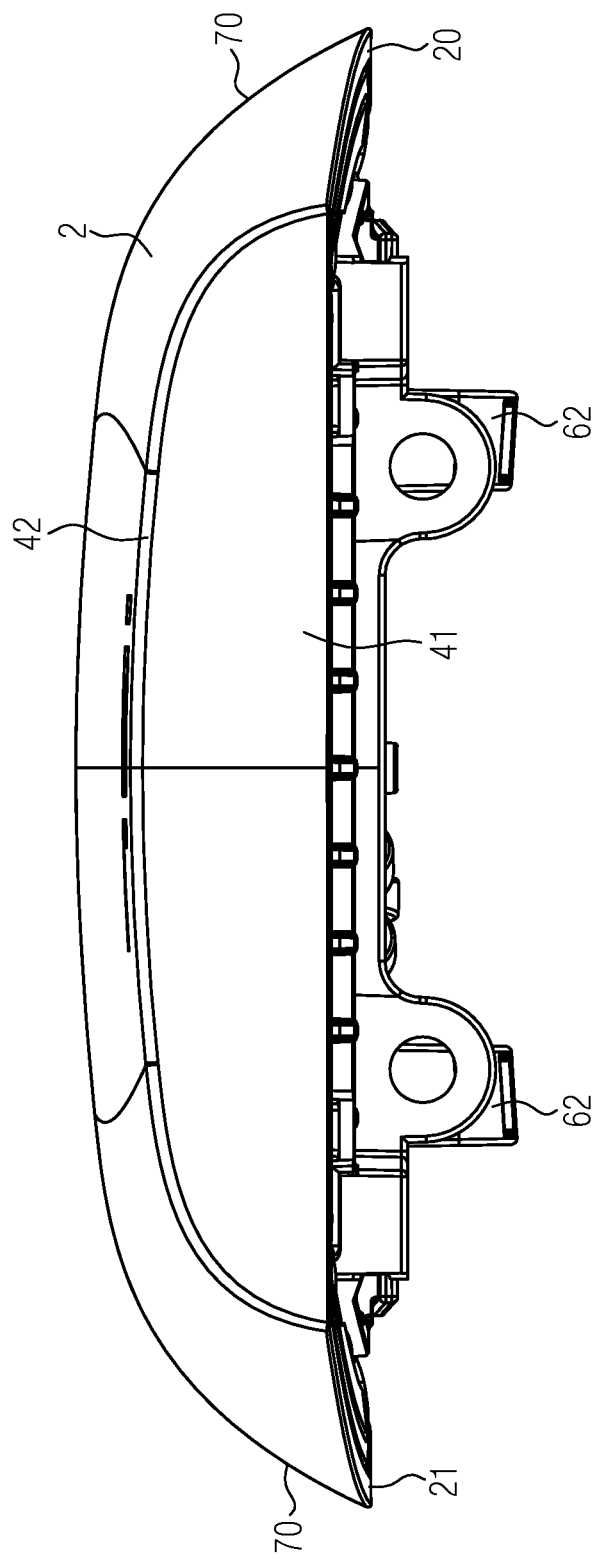
FIG. 6 is a rear view of the motorcycle seat arrangement seen in FIG. 3.

FIG. 6 shows that in the transition area between two mold surfaces, in the present case the seat surface 2 and the rear end face 41 of the molded body 1 (i.e. in the area of the intersection line 14), a structural component in the form of a piping strip 42 can be provided, which is advantageously inserted into the injection molding process during the production of molded body 1. In addition, FIG. 6 also shows the side body sections 20 and 21 of the molded body 1 which adjoin inwards on both side faces or legs 70.

FIG. 7 illustrates the seat cushion cover 69 and makes it clear that—in contrast to a seat cushion cover made of a flat material—three-dimensional patterns, representations, pictures, logos or lettering can also be integrated into molded body 1, as the three-dimensional elastic molded body 1 has an outer shape or outer shell or outer skin which (contrasted with a seat upholstery cover made of a flat or textile material) has a significantly greater wall thickness. Accordingly, three-dimensional patterns or the like can be integrated into the walls forming the outer shape of molded body 1. In the design of the molded body 1 shown in FIG. 7, a lettering 73 "701" is integrated in the area of the rear side 8, as can be seen in the view from above according to FIG. 1. Because the three-dimensional lettering "701" extends from the top side 3 of the molded body 1 in a downward direction, the seat cushion 4 has a clearance or recess 43 to accommodate the recessed area 44 of the area of the outer shell 45 of the molded body 1 forming the seat surface 2.

With reference to FIG. 12 of the drawing, the possibility of additional or optional fixing of the molded body 1 to the support structure 22 by means of auxiliary or retaining means in the form of retaining clips 36 has already been explained above.

Figure 13:
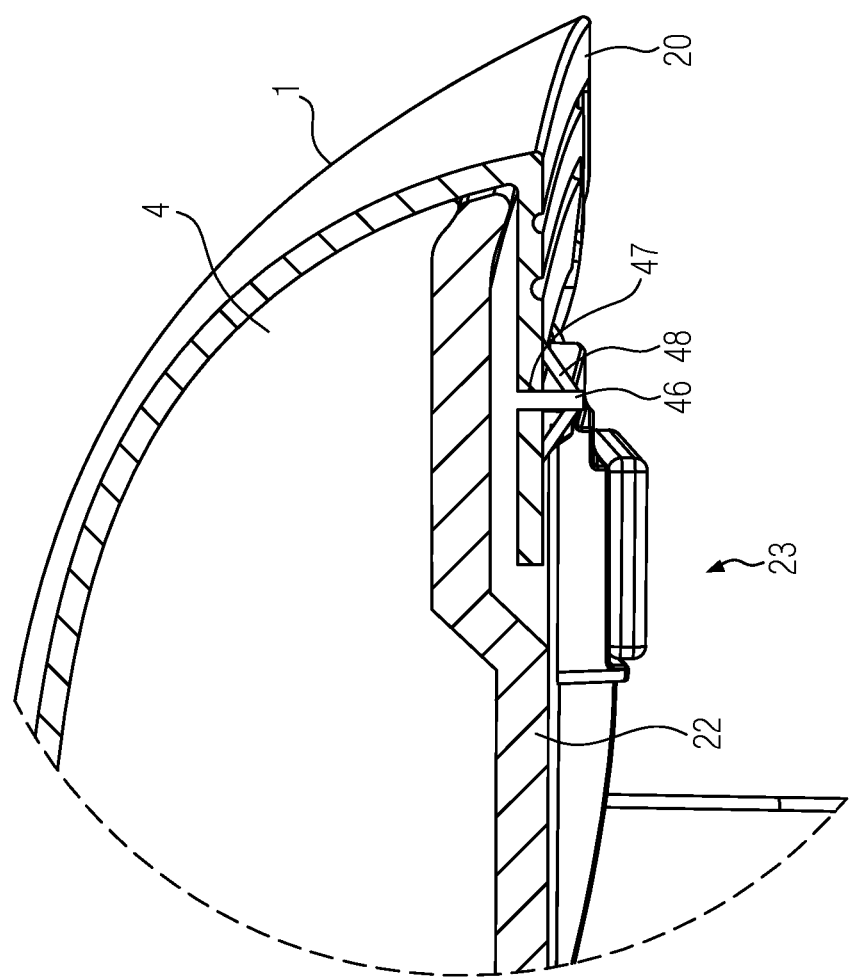
FIG. 13 is a partial sectional view, similar to that shown in FIG. 12, showing a motorcycle seat assembly with a molded body secured by lock washers.

FIG. 13 depicts another embodiment of a motorcycle seat assembly 23 with a molded body 1 arranged on a support structure 22. In the version shown, the outer edge region 72 (or the outer edge sections) of the support structure 22 have pins 46 extending in a downward direction, and which pass through recesses 47 of the inwardly extending sections 18, 19, 20 and 21. The sections are then fixed from below by means of disc-shaped connecting clips 48, which are preferably fixed to the pins 46 in a detachable manner.

Figure 14:
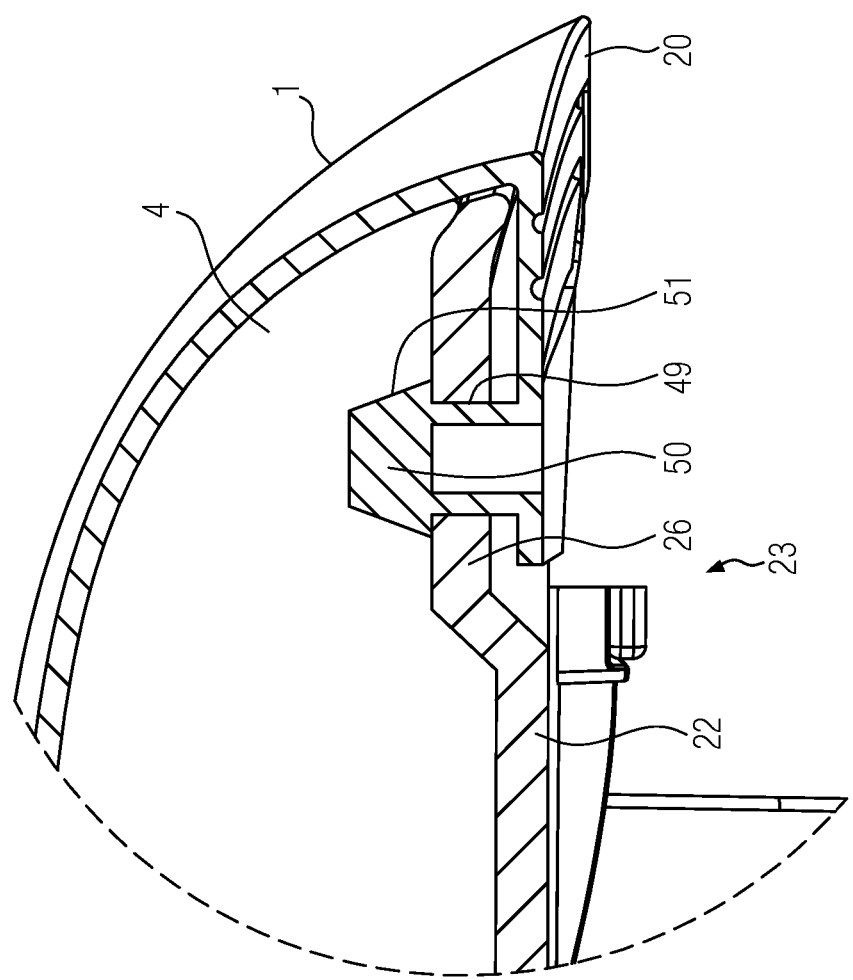
FIG. 14 is a partial sectional view, similar to that shown in FIG. 12, showing a motorcycle seat assembly with a molded body secured to the support structure of the motorcycle seat assembly by means of retaining means formed on the molded body.

FIG. 14 of the drawing shows a further version of a motorcycle seat arrangement 23 with a molded body 1 arranged on the support structure 22. As easily can be seen, in this version the support structure 22 has a molded body 2 in the area of the edge sections 24, 25, 26, 27, of which in FIG. 14 shows only the edge section 26; as an example, recesses or passages 49, which can be penetrated by mushroom-shaped and elastic holding means 50 formed integrally with the molded body 1 (by passing the mushroom-shaped holding means 50 through the recess 49, after which the mushroom-shaped head 51 of the holding means 50 expands again), so that the molded body 1 can be positively fixed to the support structure 22.

Figure 15:
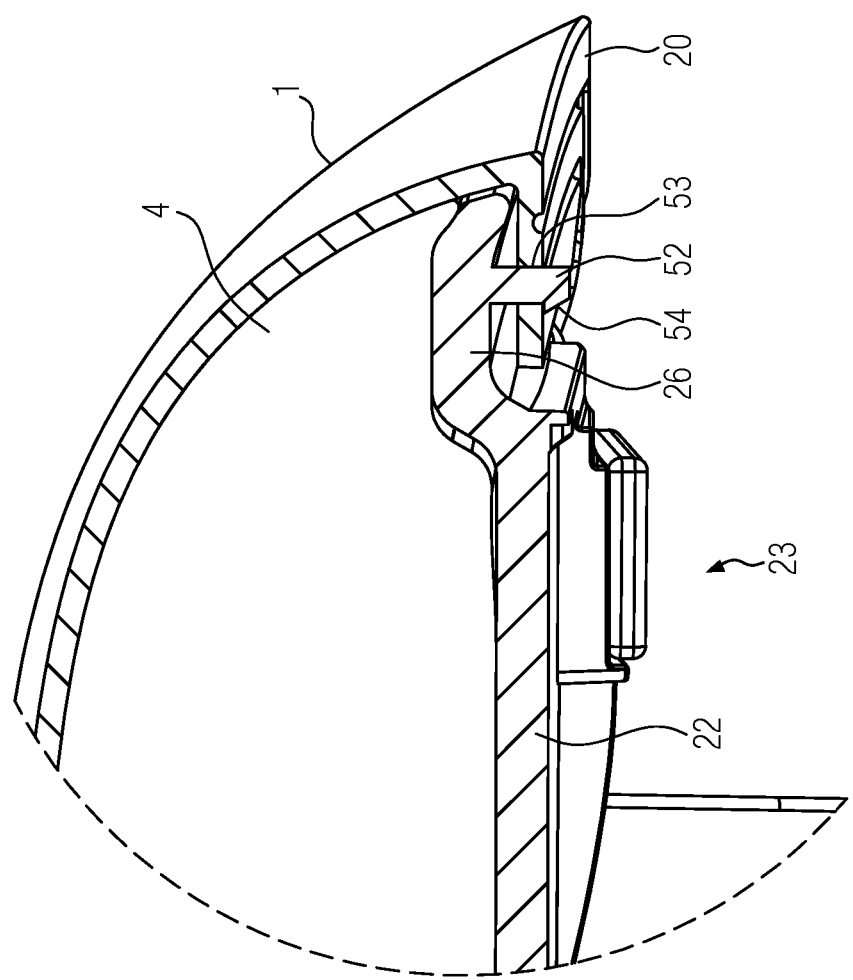
FIG. 15 is a partial sectional view, similar to that shown in FIG. 12, showing a motorcycle seat assembly with a molded body secured by retaining means formed on the support structure.

FIG. 15 illustrates an alternative embodiment of a motorcycle seat assembly 23 with a molded body 1 arranged on the support structure 22. In this version of the motorcycle seat assembly 23, the support structure 22 has a molded body 1 in the area of the outer edge sections 24, 25, 26 and 27, of which outer edge sections 24, 25, 26 and 27 shown in FIG. 15 only an edge section 26 is shown as an example, has hook-shaped retaining means 52 extending in the downward direction. Such a retaining means 52 can penetrate recesses 53 of the molded body 1 and can fix the section 20—this also applies accordingly to the other sections 19, 20 and 21 of the molded body 1—with the hook 54 arranged on the retaining means 52. Although only one hook 54 is provided in the illustrated design of the holding means 52, a further hook 54 can also be provided on the holding means 52 on the side opposite the illustrated hook 54, in one piece with the holding means 52.

Figure 16:
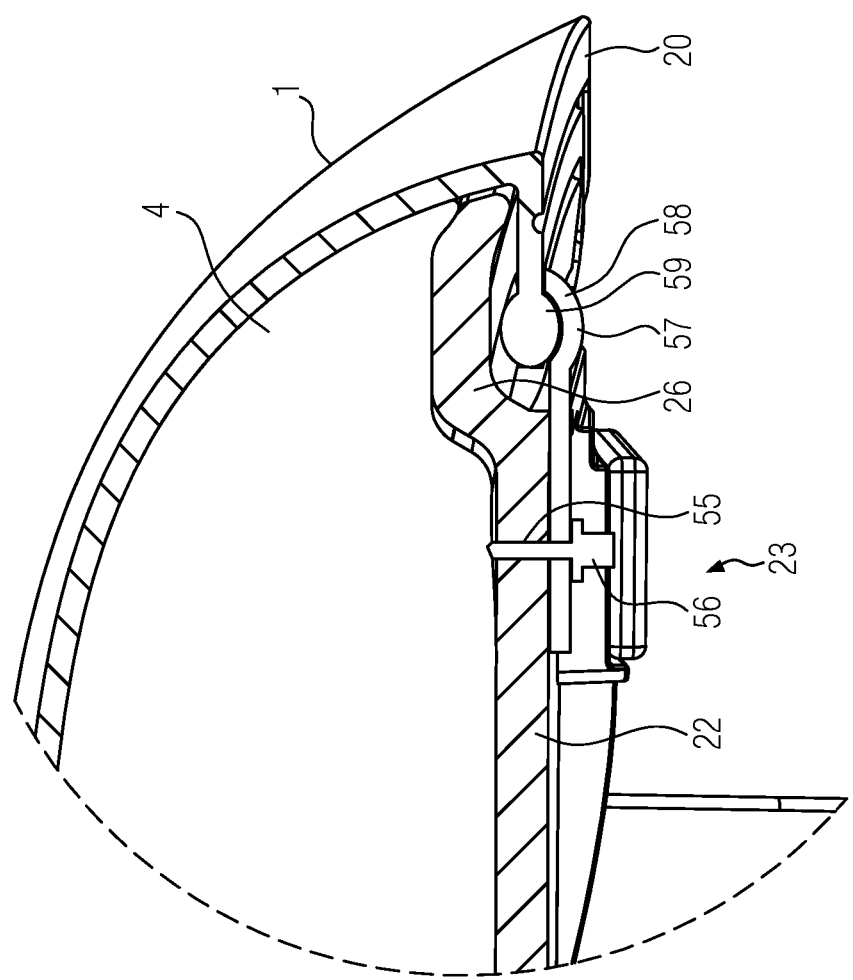
FIG. 16 is a partial sectional view, similar to that shown in FIG. 12, showing a motorcycle seat assembly with a molded body that is fixed by means of a cross-sectional enlargement formed on the molded body.

FIG. 16 depicts another embodiment of a motorcycle seat assembly 23 with a molded body 1. In this version of the motorcycle seat assembly 23, the support structure 22 has a hole or recess 55 in an area on the inside, as seen from section 26, which can be penetrated by a retaining means in the form of a pin or screw 56. As is readily apparent, the retaining means 55 can be used to detachably connect or attach a retaining component 57, for example made of a plastic material, to the support structure 22. The retaining component 57 has a leg 58 which overlaps a cross-sectional enlargement 59 formed in one piece with the molded body 1, and is pressed against the edge area or edge section 26. By simply loosening the screw 56, the retaining component 57 can then be removed from the support structure 22 and then the molded part 1 can also be removed from the support structure 22.

Figure 17:
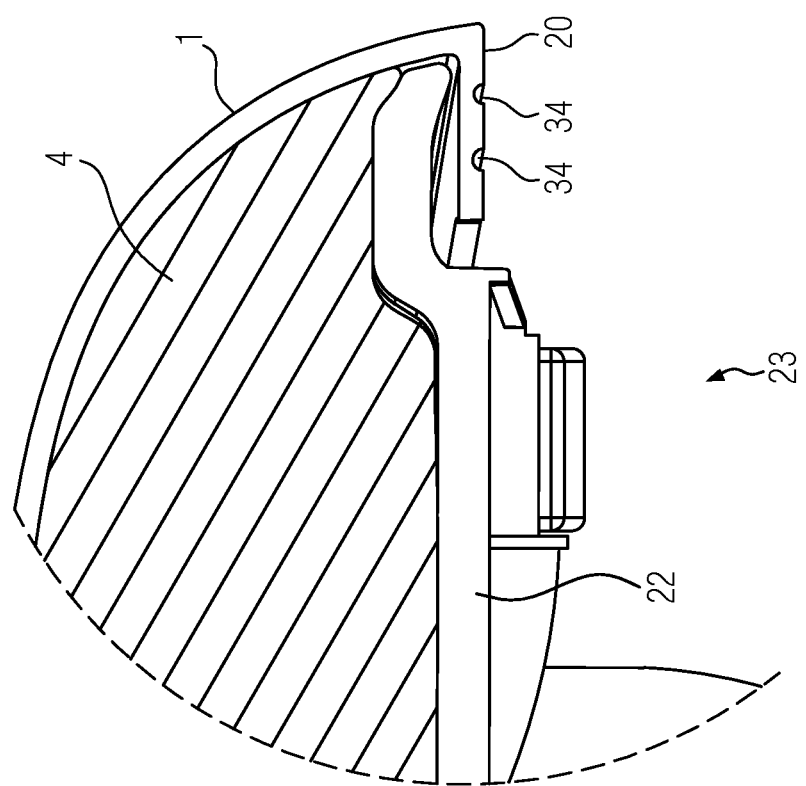
FIG. 17 is a partial sectional view of a motorcycle seat arrangement to disclose longitudinally running recess grooves provided on the molded body.

FIG. 17 of the drawing shows a partial sectional view of a motorcycle seat assembly 23 with the molded body 1 and recesses 34 formed on the exemplary section 20. The partial sectional view according to FIG. 17 runs transverse to the longitudinal center axis 5, so that it can be seen that the depressions 34 run in the longitudinal direction of section 20. FIGS. 2 and 4 also show that corresponding depressions 34 may also be formed on the other sections 18, 19 and 21 of the molded body 1. These sections each overlap the outer edge area of the support structure 22, and the recesses 34 each run along at least one area of the longitudinal extension of sections 18, 19, 20 and 21.

Figure 18:
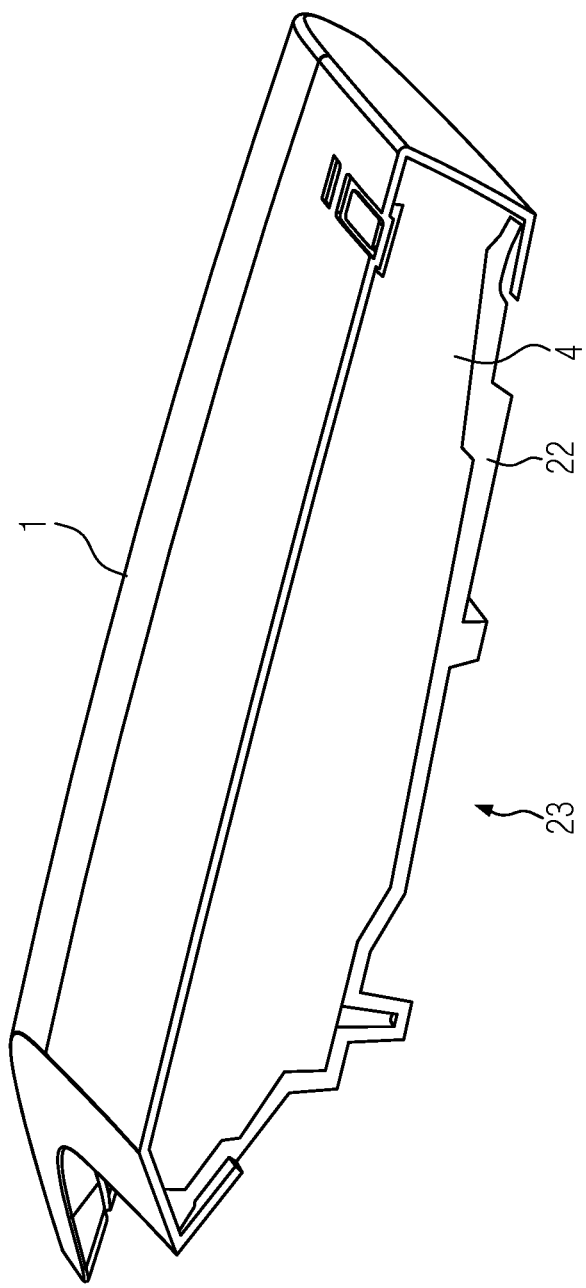
FIG. 18 is a perspective longitudinal sectional view of a motorcycle seat arrangement of a possible design according to the present invention.
Figure 22:
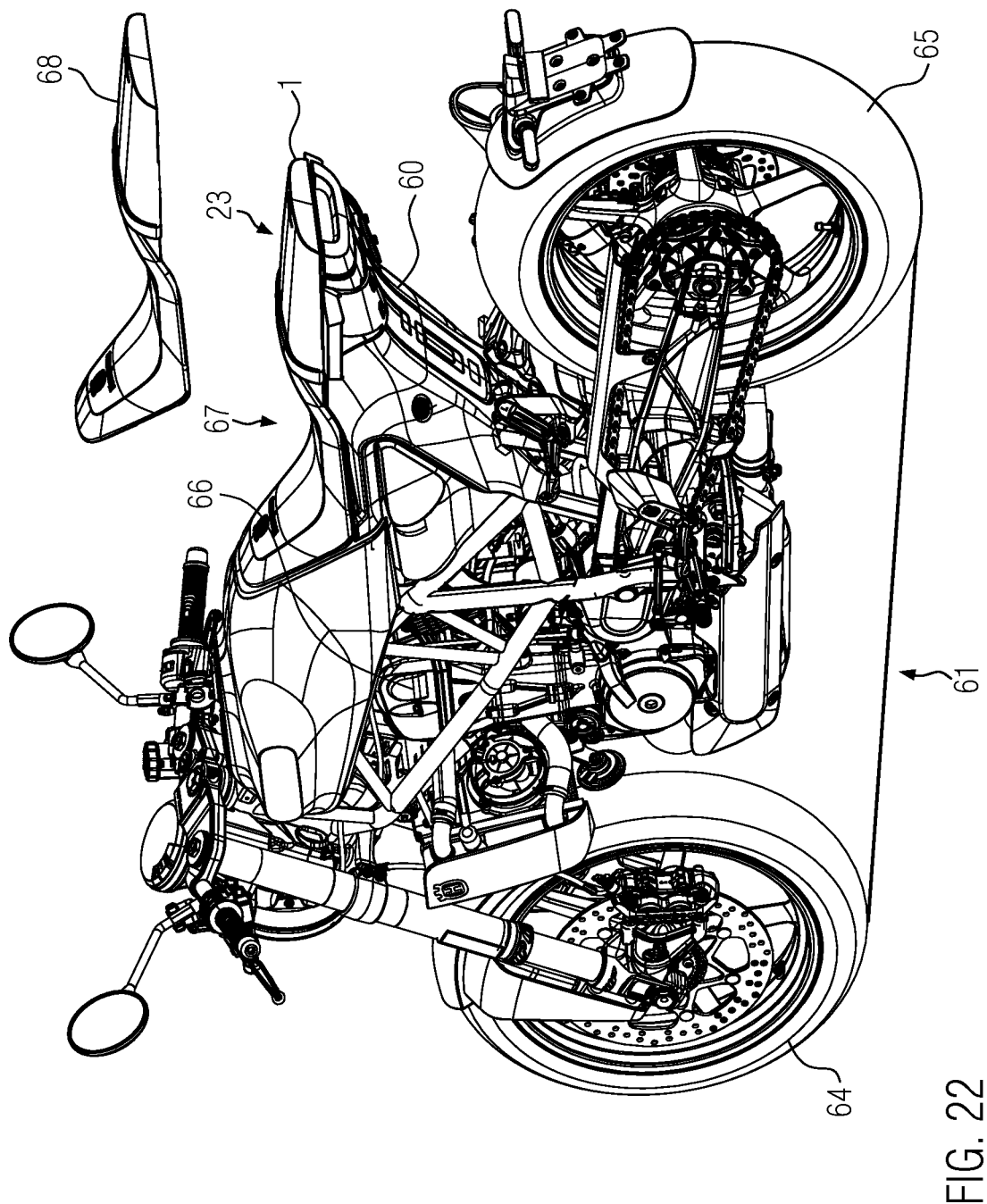
FIG. 22 is a side view of a motorcycle with the motorcycle seat arrangement according to the present invention.

FIG. 18 shows a perspective longitudinal sectional view of a motorcycle seat arrangement 23 according to one exemplary design according to the present disclosure. As can easily be seen, the molded body 1 completely covers the seat cushion 4. This means, among other things, that the seat cushion 4 is completely accommodated in the receiving space 17 of molded body 1. The example of a motorcycle seat arrangement 23 seen in FIG. 18 is a motorcycle seat arrangement for a passenger or pillion passenger. As shown in FIG. 22, the motorcycle seat arrangement 23 according to the design shown here is arranged at the rear of a motorcycle frame 60.

Although the motorcycle seat arrangement has been described above using an example of a passenger or pillion passenger seating arrangement, this should not be seen as a limitation. The motorcycle seat arrangement according to the invention can also be designed as a motorcycle seat arrangement for the rider of motorcycle 61, i.e. generally for one user of a motorcycle or for two users of a motorcycle. The motorcycle seat assembly also can also be used as a saddle for a vehicle with more than one track, for example a three-wheeled or four-wheeled vehicle, i.e., a trike or a quad, or for example also a snowmobile or a water-ski vehicle. Thus, the term "motorcycle seat assembly" or "motorcycle seat arrangement" chosen here also includes a saddle for a single-track vehicle other than a motorcycle, and also includes or includes a saddle for a vehicle with more than one track.

Figure 19:
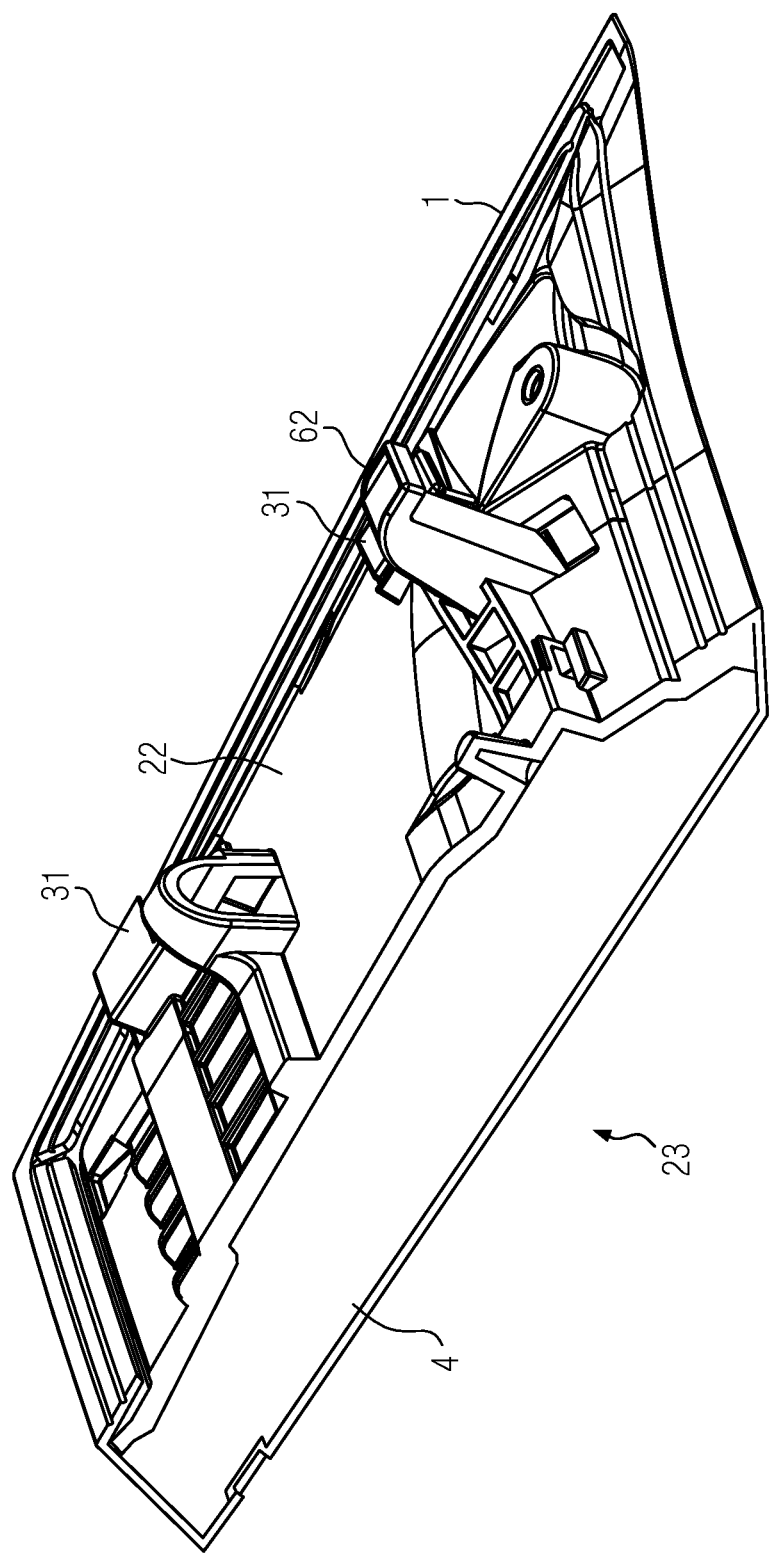
FIG. 19 is a view, from below, of a motorcycle seat arrangement according to FIG. 18.

FIG. 19 provides a longitudinal sectional view of the motorcycle seat arrangement 23 in a view from below. The support structure 22 is provided with supports 31 by which the motorcycle seat assembly 23 can be supported on the motorcycle frame 60. For this purpose, the motorcycle seat assembly 23 can be positively inserted into a recess in the motorcycle frame 60 via the bracket 62, and can be releasably locked via locking elements not shown in detail.

Figure 20:
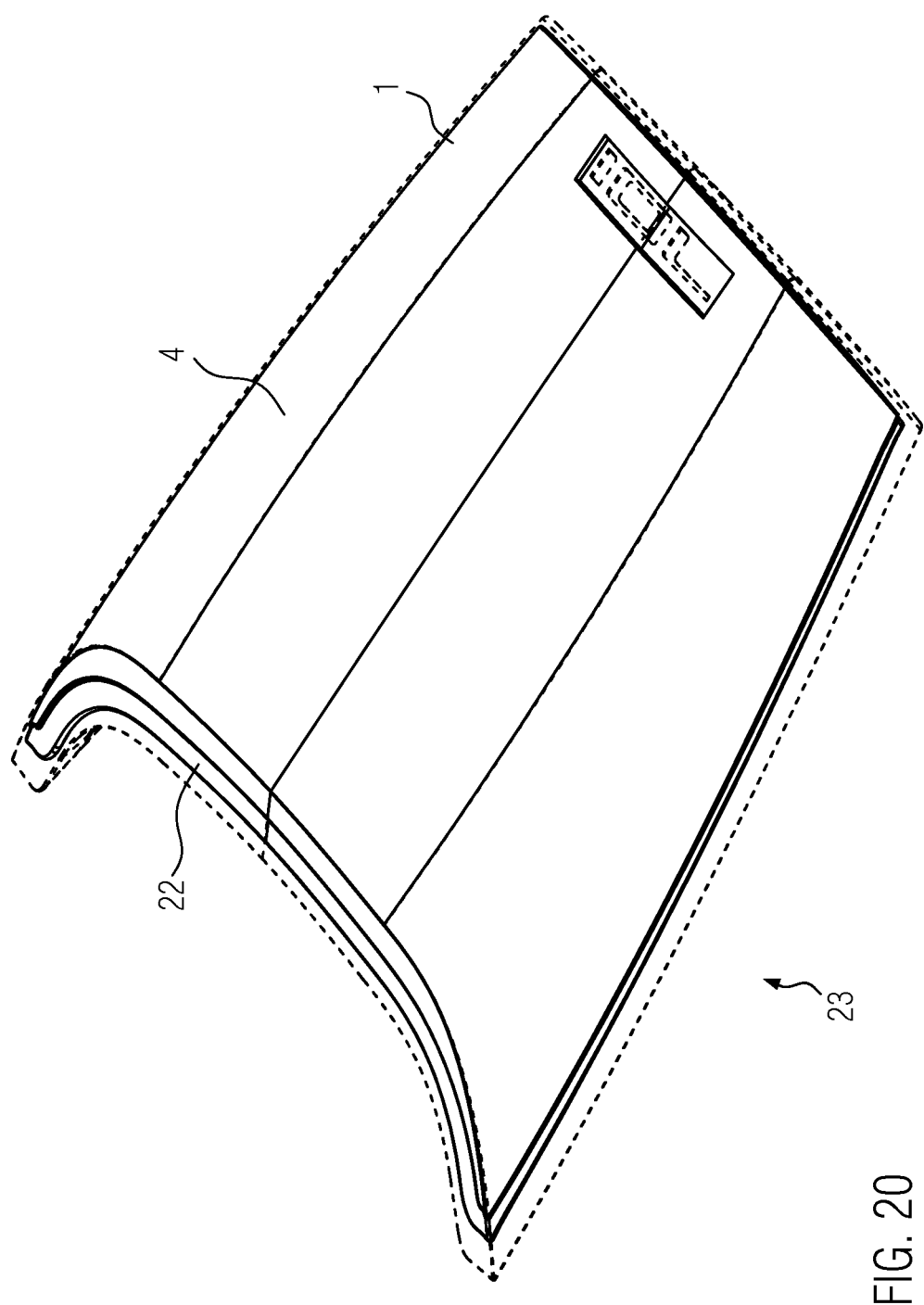
FIG. 20 is a perspective view of a motorcycle seat assembly according to the present invention, with a substantially transparent molded body.
Figure 21:
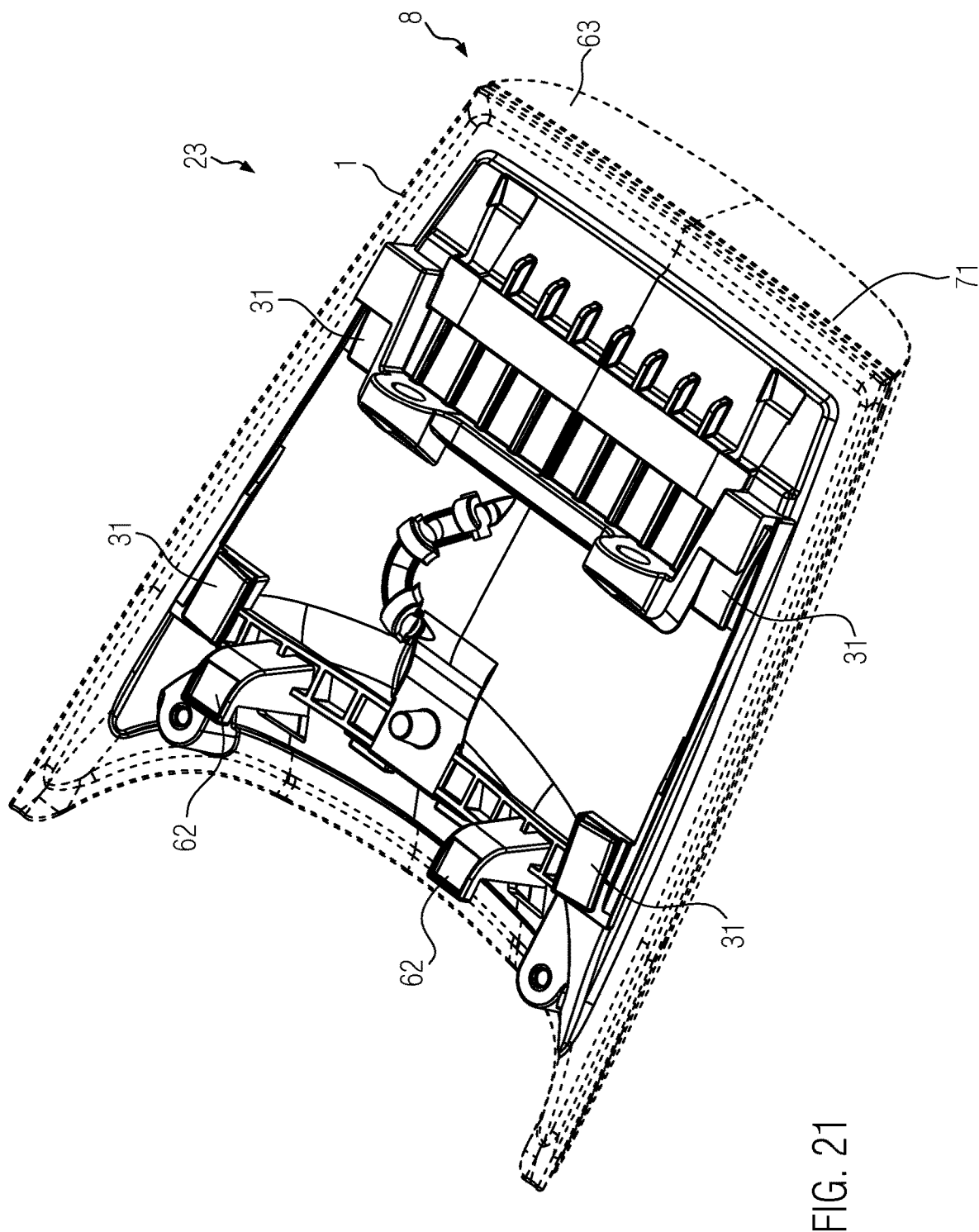
FIG. 21 is a perspective view, from below, of the motorcycle seat arrangement according to FIG. 20.

FIG. 20 illustrates an embodiment of a motorcycle seat assembly 23 or motorcycle seat arrangement 23 with a support structure 22 and a seat cushion 4 arranged on the support structure 22, as well as a molded body 1 spanning both components. The special feature of this embodiment is that molded body 1 is transparent, i.e., is composed of a foam-forming material which allows the visual appearance of the colored seat cushion 4 arranged underneath molded body 1 to be recognized. The color(s) of the cushion are visible through the substantially clear molded body. This design form according to FIG. 20, which acts as a design element, also has the advantage that, with the molded body 1 thus formed, a lighting device 63 arranged in a recess 71 at the rear 8 of the motorcycle seat assembly 23 (and integrated into the seat cushion 4) is also covered by molded body 1, and is thus protected against the penetration of moisture into the lighting device 63. This design also has the advantage that when light-emitting diodes are used for the lighting device 63, a scattering effect is produced by the translucently designed molded body 1, so that the light-emitting diodes are not optically perceived as individual light points, but a diffusion effect is produced via the scattering effect and thus the rear light or the lighting device 63 is perceived by a viewer in such a way such that it radiates light over the entire rear area.

FIG. 22 shows a motorcycle 61 with a front wheel 64, a rear wheel 65, and a drive motor 66. The motorcycle 61 also has a seat area 67, which in the version shown is designed for both a driver and a passenger and in which the seat area for the passenger is designed as a motorcycle seat arrangement 23. The seat 67 can be removed from the motorcycle frame 60 and replaced with a one-piece motorcycle seat assembly 68, as shown in FIG. 22, and is then designed as a motorcycle seat assembly 68 for both the driver and the passenger and is constructed and designed in the same way as the motorcycle seat assembly 23 explained in detail above; i.e. the seat assembly has a support structure 22 on which a seat cushion 4 is arranged, which is spanned by a seat cushion cover, and the seat cushion cover is in the form of a molded body 1 which is elastic and has a three-dimensional design.

An advantage of the motorcycle seat arrangement according to the present disclosure is that the molded body serving as a seat cushion cover can be fixed to the support structure without additional holding or fastening means, and provides exact and reproducible positioning. The surface and structure of the molded body offers a high degree of design freedom, since the selection of the material used to form the molded body can influence not only the hardness of the molded body and thus of the motorcycle seat assembly, but also the color appearance and the seating comfort provided by the seat surface for the user and the holding power, i.e. the grip that the seat surface offers the user. The texture of the seat surface and thus the motorcycle seat arrangement can also be influenced. By designing the seat cushion cover in the form of a three-dimensional elastic molded body, the motorcycle seat arrangement offers the advantage that sharp edges and negative geometries can be represented very well and that, in addition, the molded body and thus the seat surface can be mounted on the support structure without tension. In this way, a motorcycle seat arrangement can be provided that is suitable for the comfort loving touring rider on the one hand, and a motorcycle seat arrangement for the sporty ambitious rider on the other hand, as well as a motorcycle seat arrangement for off-road motorcycles.

By means of the appropriate design of the seat cushion and the molded body or also by means of the appropriate design of the molded body alone with a locally pliable material, it is also possible, for example, to achieve a dam relief for a male user of the motorcycle seat arrangement.

The motorcycle seat assembly can be mounted without the use of tools, because when the molded body is mounted on the support structure, the seat cushion is also mounted on the support structure at the same time, and the seat characteristics provided by the motorcycle seat assembly according to the invention can be changed just as quickly, by mounting a molded body with a seat cushion with other degrees of Shore hardness; for this purpose a molded body together with the seat cushion is simply removed from the support structure without the use of tools and a molded body with a seat cushion with another degree of hardness is remounted on the support structure without the use of tools. The motorcycle seat arrangement can therefore also be easily adapted to the respective user's wishes without the use of tools.

LIST OF REFERENCE SIGNS 1. molded body
2. seat surface
3. top side
4. seat cushion
5. longitudinal central axis
6. longitudinal median plane
7. front side
8. back side
9. front edge
10. intersection line
11. upper surface
12. lower surface
13. inclined surface
14. intersection line
15. side surface
16. side surface
17. recording room
18. section
19. section
20. section
21. section
22. support structure
23. motorcycle seat arrangement
24. marginal or edge section
25. marginal or edge section
26. marginal or edge section
27. marginal or edge section
28. first or top side
29. second or bottom side
30. top side
31. support
32. base
33. free space, slot
34. deepening
35. profile
36. retaining clips
37. outer contour
38. section
39. recess, recess
40. mounting surface
41. rear end face
42. piping tape
43. recess
44. receding range
45. outer shell
46. pin
47. recess
48. connecting clamps
49. recesses
50. holding device
51. head
52. holding means
53. recess
54. hook
55. bore, recess
56. screw
57. retaining component
58. leg
59. cross-section extension
60. motorcycle frame
61. motorcycle
62. mounting bracket
63. lighting equipment
64. front wheel
65. rear wheel
66. drive motor
67. seat surface
68. motorcycle seat arrangement
69. seat cushion cover
70. leg
71. recess
72. edge area or region
73. lettering With regard to the features of the invention which are not explained in detail above, explicit reference is made to the patent claims and the drawing.

What is claimed is:

1. Motorcycle seat arrangement (23) with a support structure (22) and a seat cushion (4) arranged on the support structure (22) and a seat cushion cover (69) spanning the seat cushion (4), wherein:

the support structure (22) has a first side (28) facing the seat cushion (4) and a second side (29) facing away from the seat cushion (4);

the second side (29) has at least one outer edge region (72) with at least one edge section (24, 25, 26, 27);

at least one body section (18, 19, 20, 21) of the seat cushion cover (69) overlaps at least part of the at least one edge section (24, 25, 26, 27) of the outer edge region (72); and the seat cushion cover (69) comprises an elastic molded body (1) having a three-dimensional configuration, the elastic molded body (1) comprising:

an underside facing the seat cushion (4);

an upper side (28) serving as a seat surface (3); and a receiving space (17) receiving the seat cushion (4);

wherein, when the molded body (1) is separated from the support structure (22) and/or the seat cushion (4), with a region which overlaps a part of the outer edge region of the support structure (22) resting on a flat support (32), the molded body (1) retains substantially the three-dimensional configuration.

2. The motorcycle seat arrangement (23) according to claim 1, further comprising a recess (71), formed on a rear region of the motorcycle seat arrangement (23), for receiving an illumination device (63), and wherein the elastic three-dimensional molded body (1) covers the recess (71) and is translucent in the vicinity of the recess (71).

3. The motorcycle seat arrangement (23) according to claim 1 wherein:

the molded body (1) is U-shaped in a sectional view transversely to a longitudinal central plane (6) of the molded body (1), and a side body section (20, 21) extending a direction of the longitudinal central plane is provided on at least one end region of a leg (70) thereof; and the side body section (20, 21) overlaps at least part of a section of the outer edge region of the second side (29) of the support structure (22).

4. The motorcycle seat arrangement (23) according to claim 1 wherein:

the molded body (1) has a longitudinal central axis (5) and, viewed in the direction of the longitudinal central axis (5), comprises:

a front side (7);

a rear side (8); and at least one end body section (18, 19), on the front side (7) and/or the rear side (8), extending in a direction of the seat cushion and overlapping at least a part of the section of the outer edge region of the second side (29) of the support structure (22).

5. The motorcycle seat arrangement (23) according to claim 1 wherein the at least one body section (18, 29, 20, 21) comprises a cross-sectional enlargement (59), integral with the body section, adapted to be acted upon by a holding means (57) releasably engageable with the support structure.

6. The motorcycle seat arrangement (23) according to claim 1 wherein the molded body (1) engages over the at least one edge section (24, 25, 26, 27) of the support structure (22), and is attached to the support structure (22) by an internal stress formed between the molded body (1) and the edge section.

7. The motorcycle seat arrangement (23) according to claim 1 wherein the molded body (1) comprises a plurality of body sections (18, 19, 20, 21) on edge regions (72) of the molded body (1) facing the support structure (22), wherein the plurality of body sections (18, 19, 20, 21) are formed in one piece with the molded body (1) and extend inwardly as viewed from the edge regions (72).

8. The motorcycle seat assembly (23) according to claim 7 wherein associated portions of the body sections (18, 19, 20, 21) are integrally joined together.

9. The motorcycle seat assembly (23) according to claim 7 wherein associated portions of the body sections (18, 19, 20, 21) are formed without integral physical connection.

10. The motorcycle seat arrangement (23) according to claim 1 wherein the molded body (1) has a smaller wall thickness in a region of the upper side (28) serving as the seat surface (3) than in lateral regions associated with the edge region of the support structure (22).

11. The motorcycle seat arrangement (23) according to claim 1 wherein the molded body comprises:

at least one injection-moldable material; and one uniform degree of Shore hardness, or at least two regions having differing degrees of Shore hardness.

12. The motorcycle seat arrangement (23) according to claim 1 wherein the molded body (1) comprises:

at least one injection-moldable material; and a uniform color, or at least two regions of different colors.

13. The motorcycle seat arrangement (23) according to claim 1 wherein the at least one body section (18, 19, 20, 21) is detachably connected to the edge region of the support structure (22) at least along a region of its longitudinal extension by non-positive or positive or substance locking means.

14. The motorcycle seat arrangement (23) according to claim 1 wherein the at least one body section (18, 29, 20, 21) has retaining means (51), formed integrally with the body section (18, 29, 20, 21), arrangeable in a recess (49) in the at least one edge section (24, 25, 26, 27).

15. The motorcycle seat arrangement (23) according to claim 1 wherein holding means (52) on the outer edge region of the support structure (22) are engageable with recesses (53) of the at least one body section (18, 29, 20, 21).

16. The motorcycle seat arrangement (23) according to claim 1 wherein the at least one body section (18, 19, 20, 21) has at least one recess (34) at least along a region of its longitudinal extension, which recess (34) has a depth corresponding to a partial amount of the wall thickness (H) of the at least one body section (18, 19, 20, 21).

17. A motorcycle (61) having a front wheel (64), a rear wheel (65), a drive motor (66) and a seat (67), wherein the seat is a motorcycle seat arrangement according to claim 1.

* * * * *